(12) United States Patent
Furuichi

(10) Patent No.: US 11,950,103 B2
(45) Date of Patent: Apr. 2, 2024

(54) COMMUNICATION CONTROL DEVICE, METHOD OF CONTROLLING COMMUNICATION, AND COMMUNICATION SYSTEM

(71) Applicant: Sony Corporation, Tokyo (JP)

(72) Inventor: Sho Furuichi, Tokyo (JP)

(73) Assignee: SONY CORPORATION, Tokyo (JP)

(*) Notice: Subject to any disclaimer, the term of this patent is extended or adjusted under 35 U.S.C. 154(b) by 473 days.

(21) Appl. No.: 17/264,876

(22) PCT Filed: Aug. 19, 2019

(86) PCT No.: PCT/JP2019/032327
§ 371 (c)(1),
(2) Date: Feb. 1, 2021

(87) PCT Pub. No.: WO2020/049992
PCT Pub. Date: Mar. 12, 2020

(65) Prior Publication Data
US 2021/0329469 A1    Oct. 21, 2021

(30) Foreign Application Priority Data

Sep. 5, 2018   (JP) ................. 2018-166180

(51) Int. Cl.
*H04W 16/14* (2009.01)
*H04W 4/08* (2009.01)
(Continued)

(52) U.S. Cl.
CPC ............ *H04W 16/14* (2013.01); *H04W 4/08* (2013.01); *H04W 72/0453* (2013.01); *H04W 72/541* (2023.01); *H04W 84/20* (2013.01)

(58) Field of Classification Search
CPC ... H04W 16/14; H04W 4/08; H04W 72/0453; H04W 72/541; H04W 84/20; H04W 52/367
(Continued)

(56) References Cited

U.S. PATENT DOCUMENTS

2010/0157910 A1   6/2010  Nentwig
2013/0288735 A1   10/2013 Guo
(Continued)

FOREIGN PATENT DOCUMENTS

CN    101204016 A    6/2008
CN    101433103 A    5/2009
(Continued)

OTHER PUBLICATIONS

International Search Report and Written Opinion dated Oct. 15, 2019, received for PCT Application PCT/JP2019/032327, Filed on Aug. 19, 2019, 7 pages including English Translation.
(Continued)

*Primary Examiner* — Hirdepal Singh
(74) *Attorney, Agent, or Firm* — XSENSUS LLP

(57) ABSTRACT

A communication control device (40) includes: an acquisition unit (441) that acquires a spectrum grant request following a certain scheme from a plurality of second radio systems that perform a wireless communication using a radio wave of a frequency band used by a first radio system; a classification unit (442) that groups the second radio systems into a plurality of groups according to a scheme of the spectrum grant request; and a calculation unit (443) that calculates a communication parameter of the second radio system for each of the groups.

16 Claims, 19 Drawing Sheets

(51) Int. Cl.
*H04W 72/0453* (2023.01)
*H04W 72/541* (2023.01)
*H04W 84/20* (2009.01)

(58) Field of Classification Search
USPC .......................................................... 455/454
See application file for complete search history.

(56) References Cited

U.S. PATENT DOCUMENTS

| | | | |
|---|---|---|---|
| 2014/0341150 A1 | 11/2014 | Kimura et al. | |
| 2015/0072702 A1* | 3/2015 | Chun ..................... | H04W 4/08 455/454 |
| 2018/0063844 A1 | 3/2018 | Khoshnevisan | |
| 2018/0132112 A1 | 5/2018 | Khoshnevisan | |
| 2018/0317093 A1* | 11/2018 | Li .......................... | H04W 16/14 |
| 2019/0141713 A1* | 5/2019 | Cimpu ................. | H04W 72/541 |
| 2022/0303783 A1* | 9/2022 | Khoshnevisan ........ | H04W 4/06 |

FOREIGN PATENT DOCUMENTS

| | | |
|---|---|---|
| CN | 102307351 A | 1/2012 |
| CN | 104838603 A | 8/2015 |
| CN | 105430660 A | 3/2016 |
| CN | 108476412 A | 8/2018 |
| JP | 2014042329 A | 3/2014 |
| JP | 2016-123110 A | 7/2016 |
| WO | WO-2016115990 A1 | 7/2016 |
| WO | WO-2018150303 A1 | 8/2018 |

OTHER PUBLICATIONS

Wireless Innovation Forum, "Signaling Protocols and Procedures for Citizens Broadband Radio Service (CBRS): Spectrum Access System (SAS)—Citizens Broadband Radio Service Device (CBSD) Interface Technical Specification", Document WINNF-16-S-0016, Version V1.0.0, Nov. 29, 2016.

Wireless Innovation Forum, "CBRS Certified Professional Installer Accreditation Technical Specification", Document WINNF-TS-0247, Version V1.0.0, Oct. 16, 2017, pp. 1-14.

Wireless Innovation Forum, "Signaling Protocols and Procedures for Citizens Broadband Radio Service (CBRS): Spectrum Access System (SAS)—Citizens Broadband Radio Service Device (CBSD) Interface Technical Specification", Document WINNF-TS-0016, Version V1.2.1, Jan. 3, 2018, pp. 1-52.

CEPT, "Technical and Operational Requirements for the Operation of White Space Devices Under Geo-Location Approach", ECC Report 186, Jan. 2013, pp. 1-181.

"White Space Database Provider (WSDB) Contract", Available Online At: http://www.ofcom.org.uk/_data/assets/pdf_file/0026/84077/white_space_database_contract_for_operational_use_of_wsds. pdf, 2015, pp. 1-125.

Wireless Innovation Forum, "Signaling Protocols and Procedures for Citizens Broadband Radio Service (CBRS): Spectrum Access System (SAS)—SAS Interface Technical Specification", Document WINNF-TS-0096, Version 1.2.0, Oct. 20, 2017, pp. 1-36.

Wireless Innovation Forum, "Requirements for Commercial Operation in the U.S. 3550-3700 MHz Citizens Broadband Radio Service Band", Working Document WINNF-TS-0112, Version V1.4.1, Jan. 16, 2018, pp. 1-72.

R5-174218 Introduction of Spurious emission band UE co-existence for V2X Communication Non-concurrent with E-UTRA uplink transmissions in 6.6.3G.1_1 3GPP tsg_ran WG5_Test_ex-T1 2017-08-12.

* cited by examiner

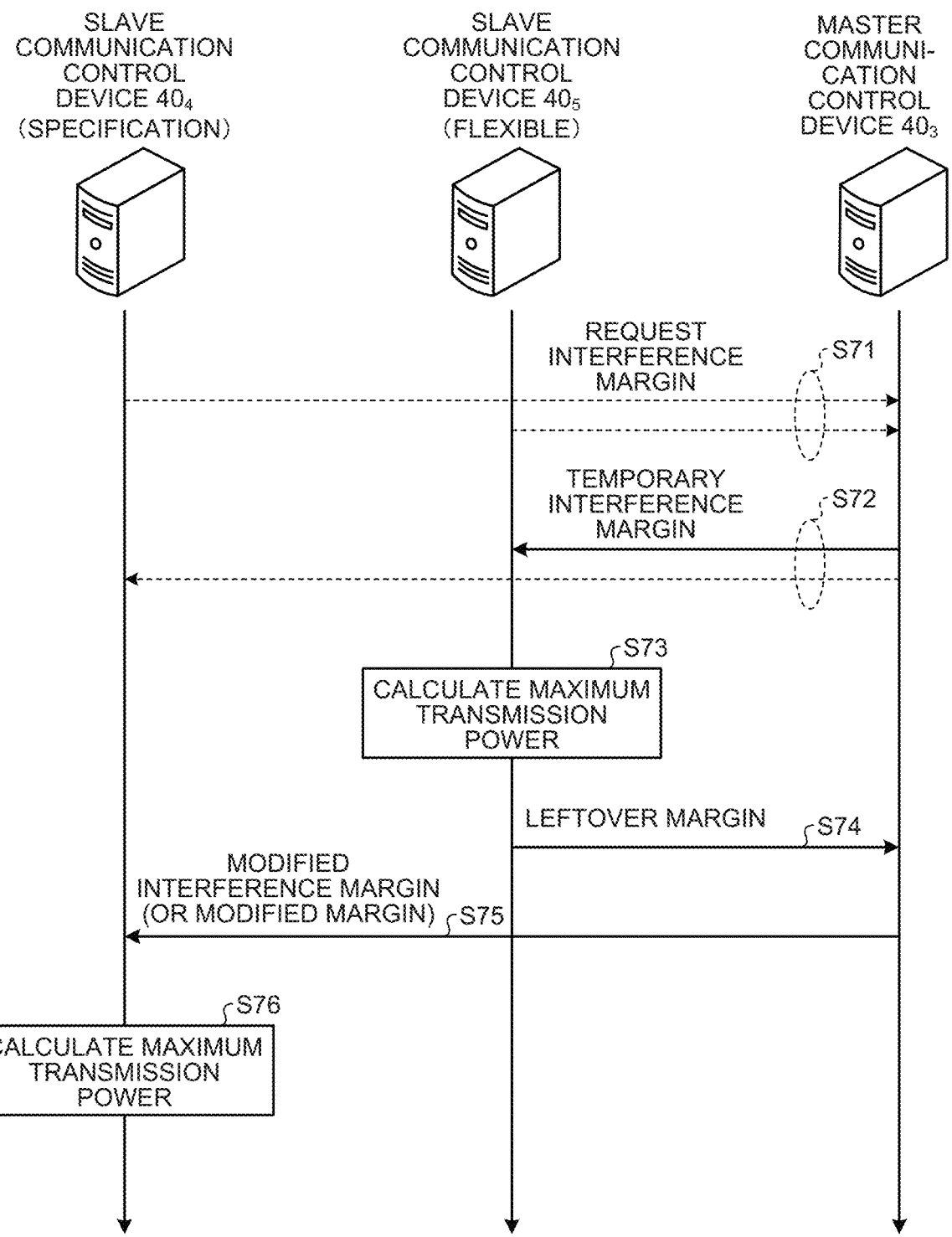

COMMUNICATION CONTROL DEVICE, METHOD OF CONTROLLING COMMUNICATION, AND COMMUNICATION SYSTEM

CROSS-REFERENCE TO RELATED APPLICATIONS

The present application is based on PCT filing PCT/JP2019/032327, filed Aug. 19, 2019, which claims priority to JP 2018-166180, filed on Sep. 5, 2018, the entire contents of each are incorporated herein by reference.

FIELD

The present disclosure relates to a communication control device, a method of controlling communication, and a communication system.

BACKGROUND

There has been a problem in that radio wave resources (radio resources) to be allocated to radio systems (radio devices) are becoming scarce. Because all radio wave bands are already used by existing radio systems (radio devices), it is difficult to allocate radio wave resources to a new radio system. Thus, in recent years, more effective utilization of radio wave resources using a cognitive radio technology is attracting attention. In the cognitive radio technology, radio wave resources are obtained using temporal and spatial white space of the existing radio systems.

CITATION LIST

Non Patent Literature

Non Patent Literature 1: WINNF-TS-0247-V1.0.0 CBRS Certified Professional Installer Accreditation Technical Specification.
Non Patent Literature 2: WINNF-TS-0016-V1.2.1 Signaling Protocols and Procedures for Citizens Broadband Radio Service (CBRS): Spectrum Access System (SAS)—Citizens Broadband Radio Service Device (CBSD) Interface Technical Specification
Non Patent Literature 3: ECC Report 186, Technical and operational requirements for the operation of white space devices under geo-location approach, CEPT ECC, 2013 January
Non Patent Literature 4: White Space Database Provider (WSDB) Contract, available at http://www.ofcom.org.uk/_data/assets/pdf file/0026/84077/w hite_space_database_contract_for_operational_use_of_wsds.pdf
Non Patent Literature 5: WINNF-TS-0096-V1.2.0 Signaling Protocols and Procedures for Citizens Broadband Radio Service (CBRS): Spectrum Access System (SAS)—SAS Interface Technical Specification
Non Patent Literature 6: WINNF-TS-0112-V1.4.1 Requirements for Commercial Operation in the U.S. 3550-3700 MHz Citizens Broadband Radio Service Band

SUMMARY

Technical Problem

However, the radio wave resources may not be effectively utilized by simply using white space. For example, to implement effective utilization of radio wave resources, white space needs to be efficiently allocated to a plurality of radio systems (radio devices). However, it is not easy to efficiently allocate the white space when there are various types of radio systems.

Accordingly, the present disclosure provides a communication control device, a method of controlling communication, and a communication system that can achieve efficient utilization of radio wave resources.

Solution to Problem

To solve the above problems, a communication control device according to the present disclosure includes: an acquisition unit that acquires a spectrum grant request following a certain scheme from a plurality of second radio systems that perform a wireless communication using a radio wave of a frequency band used by a first radio system; a classification unit that groups the second radio systems into a plurality of groups according to the scheme of the spectrum grant request; and a calculation unit that calculates a communication parameter of the second radio system for each of the groups.

BRIEF DESCRIPTION OF DRAWINGS

FIG. 24 is a sequence diagram illustrating an exchange between a master communication control device and slave communication control devices.

DESCRIPTION OF EMBODIMENTS

Figure 1:
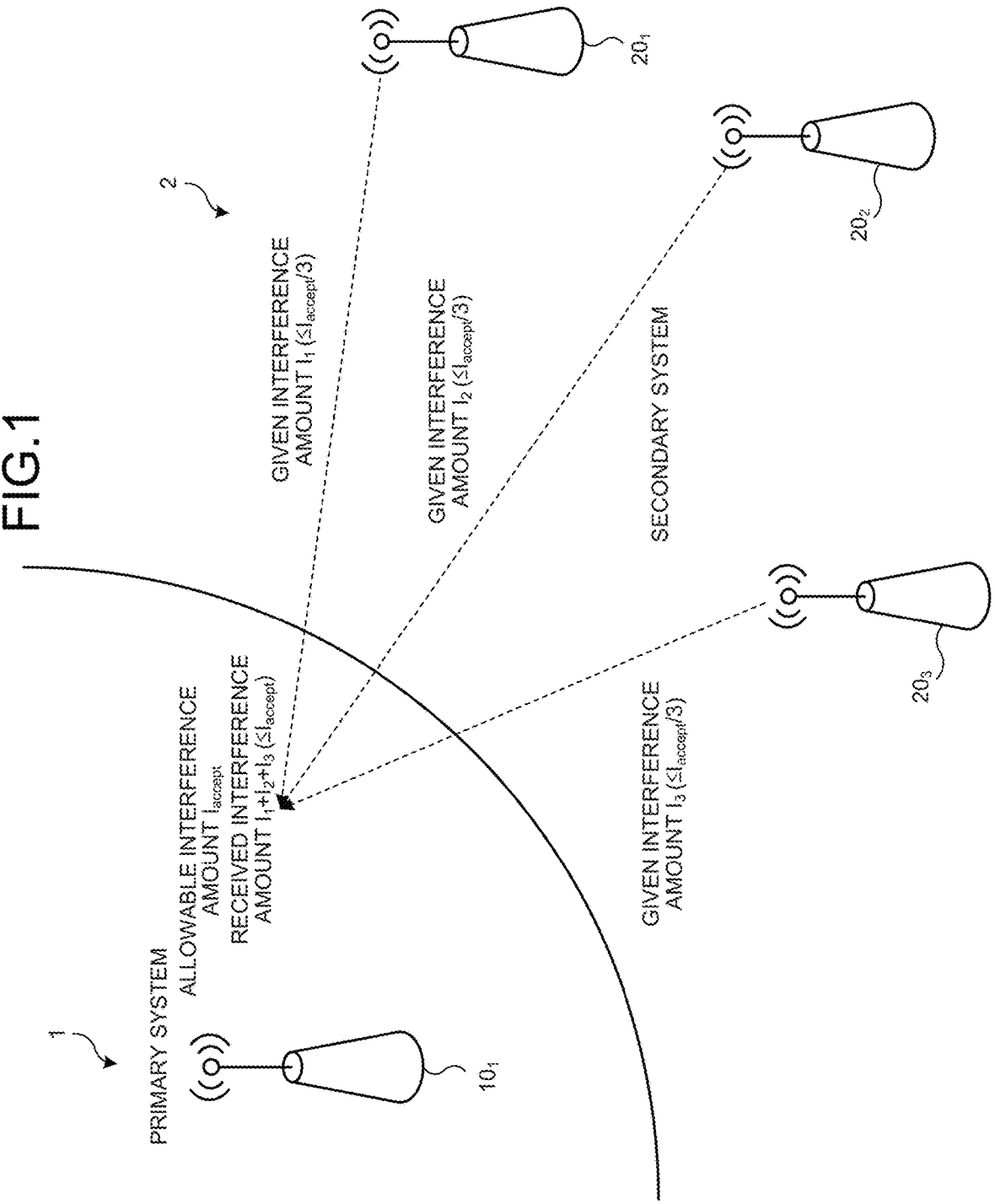
FIG. 1 is an explanatory diagram illustrating an example of allocating interference margins to communication devices configuring a secondary system.

Hereinafter, embodiments of the present disclosure will be described in detail with reference to the drawings. In the following embodiments, the same reference numerals are used to denote the same components, and repeated description thereof will be omitted.

In the present specification and drawings, a plurality of components having substantially the same functional configuration may be distinguished from each other by adding different numerals after the same reference numerals. For example, a plurality of configurations having substantially the same functional configuration are distinguished from each other such as communication control devices $40_1$ and $40_2$ according to the needs. However, when it is not necessary to particularly distinguish between the components having substantially the same functional configuration, only the same reference numeral is denoted. For example, when it is not necessary to particularly distinguish between the communication control devices $40_1$ and $40_2$, the communication control devices $40_1$ and $40_2$ are simply referred to as a communication control device 40.

The present disclosure will be described according to the following item order.

1. Introduction
2. Configuration of Communication System
2-1. Overall Configuration of Communication System
2-2. Configuration of Communication Device
2-3. Configuration of Terminal Device
2-4. Configuration of Communication Control Device
3. Interference Model
4. Method for Protecting Primary System
4-1. Interference Margin Batch Allocation Type
4-2. Interference Margin Iterative Allocation Type
5. Explanation of Various Procedures
5-1. Registration Procedure
5-2. Available Spectrum Query Procedure
5-3. Spectrum Grant Procedure
5-4. Spectrum Use Notification
5-5. Addition to Various Procedures
5-6. Various Procedures relating to Terminal Device
5-7. Procedures Generated between Communication Control Devices
6. Operation of Protecting Primary System
6-1. Communication Control Process
6-2. Maximum Allowable Transmission Power Calculation Process (First Example)
6-3. Maximum Allowable Transmission Power Calculation Process (Second Example)
6-4. Maximum Allowable Transmission Power Calculation Process (Third Example)
7. Modifications
7-1. Master/Slave Model
7-2. Application of Embodiment
7-3. Modification of System Configuration
7-4. Other Modifications
8. Conclusion
1. Introduction There has been a problem in that radio wave resources (for example, frequencies) to be allocated to radio systems are becoming scarce. However, because all radio wave bands are already used by the existing radio systems, it is difficult to allocate new radio wave resources. Thus, in recent years, more effective utilization of radio wave resources using a cognitive radio technology is attracting attention.

In the cognitive radio technology, radio wave resources are obtained using temporal and spatial white space of the existing radio systems (for example, dynamic spectrum access (DSA)). For example, in the United States, legislation and standardization of citizens broadband radio service (CBRS) using spectrum sharing technologies are accelerating, to open the federal use band (3.55-3.70 GHz) overlapping the frequency bands of 3GPP bands 42 and 43 worldwide, to the general public.

The cognitive radio technology not only contributes to dynamic spectrum access, but also to the improvement of the spectrum utilization efficiency of radio systems. For example, coexistence techniques between radio systems using white space are prescribed in the European Telecommunications Standards Institute (ETSI) EN 303 387 and Institute of Electrical and Electronics Engineers Inc. (IEEE) 802.19.1-2014.

In general, in spectrum sharing, a national regulatory authority (NRA) of a country or a region imposes obligations to protect the radio system (primary system) of the first user (primary user) that is licensed or authorized to use the frequency band. Typically, an allowable interference reference value of the primary system is provided by the NRA, and the second user (secondary user) of the radio system (secondary system) is required to keep a given interference caused by sharing below the allowable interference reference value.

For example, to implement spectrum sharing, the communication control device (for example, spectrum management database) controls the communication of the secondary system such that the secondary system does not give a fatal interference to the primary system. The communication control device is a device for managing communication of the communication device and the like. For example, the communication control device is a device (system) for managing radio wave resources (for example, frequencies) such as a geo-location database (GLDB) and a spectrum access system (SAS). In the present embodiment, the communication control device corresponds to a communication control device 40 (for example, communication control devices $40_1$ and $40_2$ illustrated in FIG. 4), which will be described below. The communication control device 40 will be described in detail below.

For example, in this example, the primary system is a system (for example, existing system) that uses radio waves in a predetermined frequency band prior to the other system such as a secondary system. For example, the secondary system is a system that secondarily uses the radio waves in the frequency band used by the primary system (for example, dynamic spectrum access). The primary system and the secondary system may be configured of a plurality of communication devices, or may be configured by a single communication device. The communication control device allocates an allowable interference amount (may also be referred to as an interference margin) to one or more communication devices so that the interference aggregation of one or more communication devices, which are configuring the secondary system, applied to the primary system does not exceed the allowable interference amount of the primary system. In such a case, the allowable interference amount may also be an interference amount defined in advance by the operator of the primary system, public authorities managing the radio waves, or the like. In the following explanation, the interference margin indicates the allowable interference amount. The interference aggregation may also be referred to as an aggregated given interference power.

FIG. 1 is an explanatory diagram illustrating an example of allocating interference margins to communication devices configuring a secondary system. In the example illustrated in FIG. 1, a communication system 1 is the primary system, and a communication system 2 is the secondary system. The communication system 1 includes a communication device $10_1$ and the like. The communication system 2 includes communication devices $20_1$, $20_2$, $20_3$, and the like. In the example of FIG. 1, the communication system 1 only includes a single communication device 10. However, the communication system 1 may also include a plurality of the communication devices 10. In the example of FIG. 1, the communication system 2 includes three communication devices 20. However, the communication system 2 may also include less than three communication devices 20, or may include more than three communication devices 20. In the example of FIG. 1, there are only one primary system (communication system 1 in the example of FIG. 1) and one secondary system (communication system 2 in the example of FIG. 1). However, there may also be a plurality of primary systems and secondary systems.

The communication device $10_1$ and the communication devices $20_1$, $20_2$, and $20_3$ can each transmit and receive radio waves. The allowable interference amount of the communication device $10_1$ is $I_{accept}$. The interference amounts applied to a predetermined protection point of the communication system 1 (primary system) from the communication devices $20_1$, $20_2$, and $20_3$ are given interference amounts $I_1$, $I_2$, and $I_3$, respectively. In this example, the protection point is an interference calculation reference point used for protecting the communication system 1.

The communication control device allocates the interference margin $I_{accept}$ to the communication devices 20 so as the interference aggregation at the predetermined protection point of the communication system 1 (received interference amount $I_1+I_2+I_3$ illustrated in FIG. 1) does not exceed the interference margin $I_{accept}$. For example, the communication control device allocates the interference margin $I_{accept}$ to the communication devices 20 so that the given interference amounts $I_1$, $I_2$, and $I_3$ each become $I_{accept}/3$. The communication control device may also allocate the interference margin $I_{accept}$ to the communication devices 20 such that the given interference amounts $I_1$, $I_2$, and $I_3$ each become smaller than $I_{accept}/3$. Needless to say, the method of allocating the interference margin is not limited to the example.

The communication control device calculates the maximum transmission power allowed to each of the communication devices 20 (hereinafter, referred to as a maximum allowable transmission power) on the basis of the interference amount allocated to the communication device 20 (hereinafter, referred to as an allocated interference amount). For example, the communication control device calculates the maximum allowable transmission power of each communication device 20, by counting backward from the allocated interference amount, on the basis of a propagation loss, an antenna gain, and the like. The communication control device then notifies the communication devices 20 of information on the calculated maximum allowable transmission power.

To protect the primary system, there are some known techniques for determining the maximum allowable transmission power of the secondary system.

For example, Non Patent Literature 3 discloses three kinds of schemes of calculating maximum allowable transmission power (fixed/predetermined, flexible, and flexible minimized) on the basis of the position information of the secondary system in the database, as a technique for protecting a digital television broadcast (DTV) receiver or a wireless microphone, which is the primary system, from the secondary systems.

Moreover, for example, Non Patent Literature 6 discloses a technique referred to as an iterative allocation process (IAP) that adjusts a desired transmission power of a secondary system in the database so that the given interference falls below the allowable interference reference value of the primary system, on the basis of the position information of the secondary system.

The technical difference between the former and the latter is the maximum allowable transmission power of the secondary system used as a reference. In the former, the maximum allowable transmission power of the secondary system is obtained by using a "value uniquely calculated from a positional relation between the protection reference point of the primary system and the secondary system" as a reference value, and calculating and applying the adjustment value, on the basis of one of the three kinds of schemes. On the other hand, in the latter, the maximum allowable transmission power of the secondary system is adjusted until the maximum allowable transmission power falls below the allowable interference reference value of the primary system, using a "desired transmission power of the secondary system" as a reference value.

Thus, which method to be used depends on the form of the secondary system (for example, topology). For example, it is preferable to apply the latter, if all the secondary systems notify the database of a desired transmission power.

However, depending on the embodiment, all the secondary systems may not always notify the database of a desired transmission power. In such a case, the former or the latter technique needs to be used depending on the form described above (for example, topology). However, a technique of using different methods for protecting the primary system depending on the situation has not been disclosed yet.

In the present embodiment, the communication control device acquires a spectrum grant request following a certain scheme from the secondary systems. The communication control device then groups the secondary systems into a plurality of groups according to the scheme of the spectrum grant request, and calculates the communication parameters of the secondary system for each group. Consequently, in the communication control device, even when the secondary systems in different forms coexist, the optimal allocation of radio wave resources becomes possible, according to the scheme of the spectrum grant request. As a result, the efficient utilization of radio wave resources will be possible.

The communication control device may also calculate the communication parameters of the secondary system in a predetermined group order. By first calculating the group in which the interference margin is likely to left over, it is possible to allocate the interference margin (leftover margin) remained in the first calculated group to the following group. As a result, more efficient utilization of radio wave resources will be possible.

In the present embodiment, it is assumed that the primary system (communication system 1) and the secondary system (communication system 2) are in a spectrum sharing environment. An explanation will be given using the CBRS established by the Federal Communications Commission (FCC) of the United States as an example.

Figure 2:
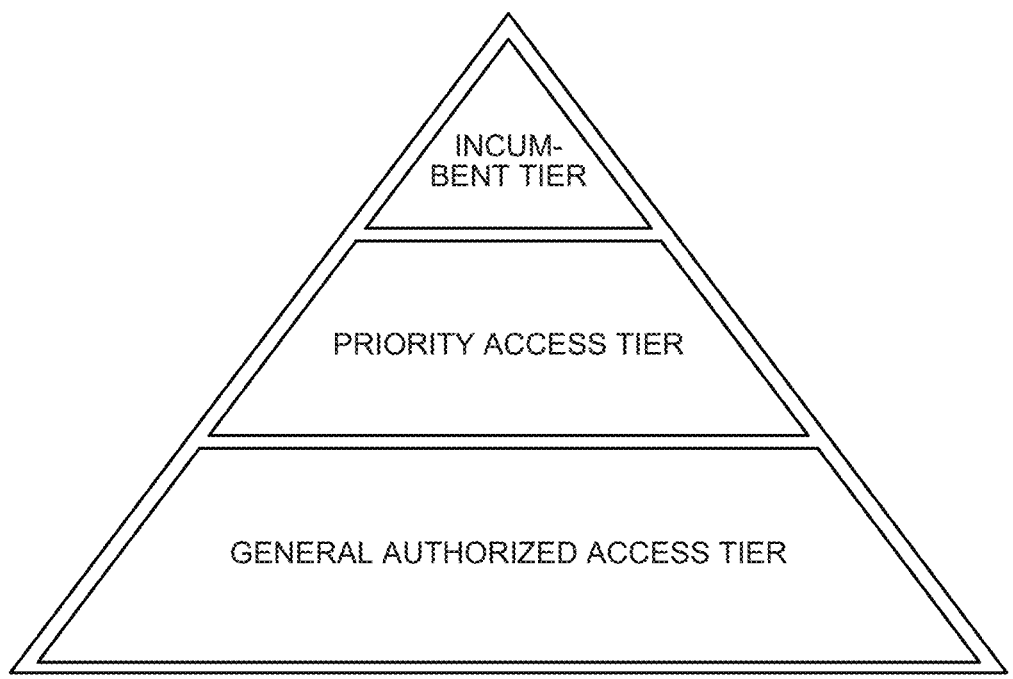
FIG. 2 is an explanatory diagram illustrating a tiered structure of a CBRS.

FIG. 2 is an explanatory diagram illustrating a tiered structure of the CBRS. As illustrated in FIG. 2, users of the frequency band are classified into one of three groups. The groups are referred to as "tiers". A tiered structure of the three groups includes an Incumbent tier, a Priority Access tier, and a General Authorized Access tier. In the tiered structure, the Priority Access tier is placed above the General Authorized Access tier, and the Incumbent tier is placed above the Priority Access tier. For example, in the CBRS, a system (existing system) in the Incumbent tier is the primary system, and a system in the General Authorized Access tier and the Priority Access tier is the secondary system.

The Incumbent tier is a group including existing users of the shared frequency band. In the CBRS, the Department of Defense (DOD), fixed satellite services, and Grandfathered Wireless Broadband Licensees (GWBLs) are defined as existing users. The "Incumbent tier" users are not required to avoid or suppress interference to the "Priority Access tier" and the "GAA tier" that have a lower priority. Moreover, the "Incumbent tier" users are protected from interference from the "Priority Access tier" and the "GAA tier". In other words, the "Incumbent tier" users can use the frequency band without considering the presence of other groups.

The Priority Access tier is a group including users who have a license referred to as a priority access license (PAL). The "Priority Access tier" users are required to avoid or suppress interference to the "Incumbent tier" that has a higher priority than the "Priority Access tier", but are not required to avoid or suppress interference to the "GAA tier" that has a lower priority than the "Priority Access tier". The "Priority Access tier" users are not protected from interference from the "Incumbent tier" that has a higher priority than the "Priority Access tier", but are protected from interference from the "GAA tier" that has a lower priority than the "Priority Access tier".

The GAA tier is a group including all users who do not belong to the "Incumbent tier" or the "Priority Access tier". The GAA tier users are required to avoid or suppress interference to the "Incumbent tier" and the "Priority Access tier" that have a higher priority. The "GAA tier" users are also not protected from interference from the "Incumbent tier" and the "Priority Access tier" that have a higher priority. In other words, the "GAA tier" is a "tier" required to use opportunistic spectrum, legislatively.

The definition of the tiered structure is not limited to the above. In general, the CBRS has a three-tiered structure, but may also have a two-tiered structure. As a typical example, there is a two-tiered structure such as licensed shared access (LSA) and TV band white space (TVWS). In the LSA, a structure equivalent to the combination of the above-mentioned "Incumbent tier" and "Priority Access tier" is employed. In the TVWS, a structure equivalent to the combination of the above-mentioned "Incumbent tier" and "GAA tier" is employed. Moreover, there may also be four or more tiers. More specifically, for example, an intermediate tier corresponding to the "Priority Access tier" may be further prioritized and the like. Moreover, for example, the "GAA tier" may be similarly prioritized.

Figure 3:
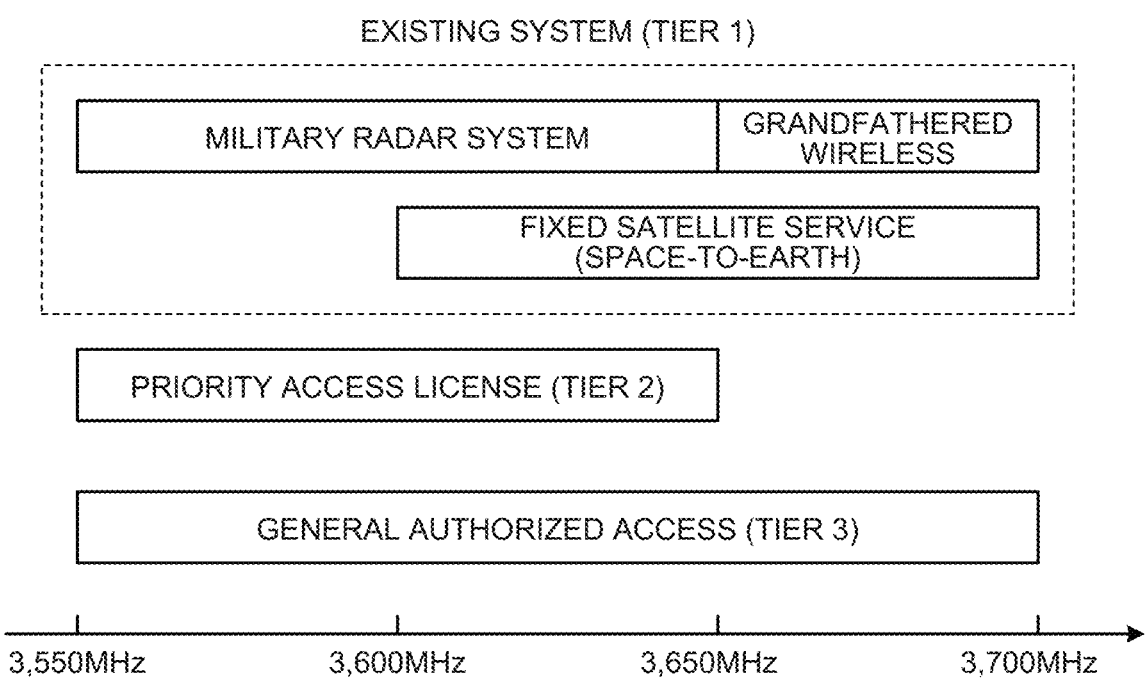
FIG. 3 is an explanatory diagram illustrating the CBRS band.

FIG. 3 is an explanatory diagram illustrating the CBRS band. For example, in the CBRS described above, the primary system is a military radar system, a Grandfathered Wireless system, or a fixed satellite service (space-to-earth). A typical example of the military radar system is a shipborne radar. The secondary system is a wireless network system including a base station and a terminal referred to as a citizens broadband radio service device (CBSD) and an end user device (EUD). The secondary system is further prioritized into a priority access license (PAL) that allows the users to access a shared band with the license, and general authorized access (GAA) similar to license exempt. A tier 1 illustrated in FIG. 3 corresponds to the Incumbent tier illustrated in FIG. 2. A tier 2 illustrated in FIG. 3 corresponds to the Priority Access tier illustrated in FIG. 2. A tier 3 illustrated in FIG. 3 corresponds to the General Authorized Access tier illustrated in FIG. 2.

The primary system (communication system 1) of the present embodiment is not limited to the example illustrated in FIG. 3. The primary system (communication system 1) may also be another type of radio system. For example, another radio system may be used as the primary system depending on the country, region, and frequency band to be applied. For example, the primary system may be a television broadcasting system such as a digital video broadcasting-terrestrial (DVB-T) system. The primary system may also be a radio system called a fixed system (FS). The primary system may also share spectrum in the other frequency band. As a typical example, there are LSA and TV band white space (TVWS). The primary system may also be a cellular communication system such as a Long Term evolution (LTE) and a New Radio (NR). The primary system may also be an aeronautical radio system such as an aeronautical radio navigation service (ARNS). Needless to say, the primary system is not limited to the radio systems described above, and may also be a radio system of another type.

The white space used by the communication system 2 is not limited to the radio waves in the federal use band (3.55-3.70 GHz). The communication system 2 may also use radio waves in the frequency band different from the federal use band (3.55-3.70 GHz) as the white space. For example, if the primary system (communication system 1) is a television broadcasting system, the communication system 2 may be a system that uses the TV white space as the white space. In this example, the TV white space refers to a frequency band not used by the television broadcasting system, among the frequency channels allocated to the television broadcasting system (primary system). In such a case, the TV white space may also be an unused channel depending on a region.

The relation between the communication system 1 and the communication system 2 is not limited to the relation of spectrum sharing in which the communication system 1 is the primary system, and the communication system 2 is the secondary system. The relation between the communication system 1 and the communication system 2 may also be a relation of network coexistence between the same or different radio systems using the same frequency.

In general, in spectrum sharing, the existing system using the target band is referred to as a primary system, and the secondary user is referred to as a secondary system. However, when the present embodiment is used in an environment other than a spectrum sharing environment, these terms may be replaced with other terms. For example, a macro cell in the Heterogeneous Network (HetNet) may be referred to as a primary system, and a small cell and a relay station may be referred to as a secondary system. Moreover, the base station may be referred to as a primary system, and a Relay user equipment (UE) and a Vehicle UE for implementing device-to-device (D2D) and vehicle-to-everything (V2X) that are present in the coverage may also be referred to as a secondary system. The base station is not limited to a fixed type, and may also be a portable type or a movable type. In such a case, for example, the communication control device provided in the present invention may also be included in a base station, a relay station, a Relay UE, or the like.

The term "frequency" used in the following explanation may also be replaced with another term. For example, the term "frequency" may be replaced with terms such as a "resource", a "resource block", a "resource element", a "channel", a "component carrier", a "carrier", and a "sub-carrier", and a term having the same meaning as the above-described terms.

2. Configuration of Communication System

Hereinafter, the communication system 2 according to the embodiment of the present disclosure will be described. The communication system 2 is a wireless communication system that performs a wireless communication by secondarily using the radio waves used by the communication system 1 (first radio system). For example, the communication system 2 is a wireless communication system that performs dynamic spectrum access to the white space of the communication system 1. By using a predetermined radio access technology, the communication system 2 provides a radio service to users or devices owned by the users.

In this example, the communication system 2 may also be a cellular communication system such as wideband code division multiple access (W-CDMA), code division multiple access 2000 (cdma 2000), LTE, or NR. In the following explanation, it is assumed that the "LTE" includes LTE-Advanced (LTE-A), LTE-Advanced Pro (LTE-A Pro), and Evolved Universal Terrestrial Radio Access (EUTRA). It is assumed that the "NR" includes a New Radio Access Technology (NRAT) and Further EUTRA (FEUTRA). The communication system 2 is not limited to the cellular communication system. For example, the communication system 2 may also be another wireless communication system such as a wireless local area network (LAN) system, a television broadcasting system, an aeronautical radio system, and a space wireless communication system.

In the present embodiment, the communication system 1 is a primary system, and the communication system 2 is a secondary system. As described above, there may also be a plurality of the communication systems 1 and the communication systems 2. In the example illustrated in FIG. 1, the communication system 1 includes a single communication device 10 (communication device $10_1$ illustrated in FIG. 1). However, the communication system 1 may also include a plurality of the communication devices 10. The configuration of the communication device 10 may be the same as that of the communication device 20 or a terminal device 30, which will be described below.

2-1. Overall Configuration of Communication System

Typically, the communication system 2 is formed by the following entities.

Communication Device
Terminal Device
Communication Control Device

Figure 4:
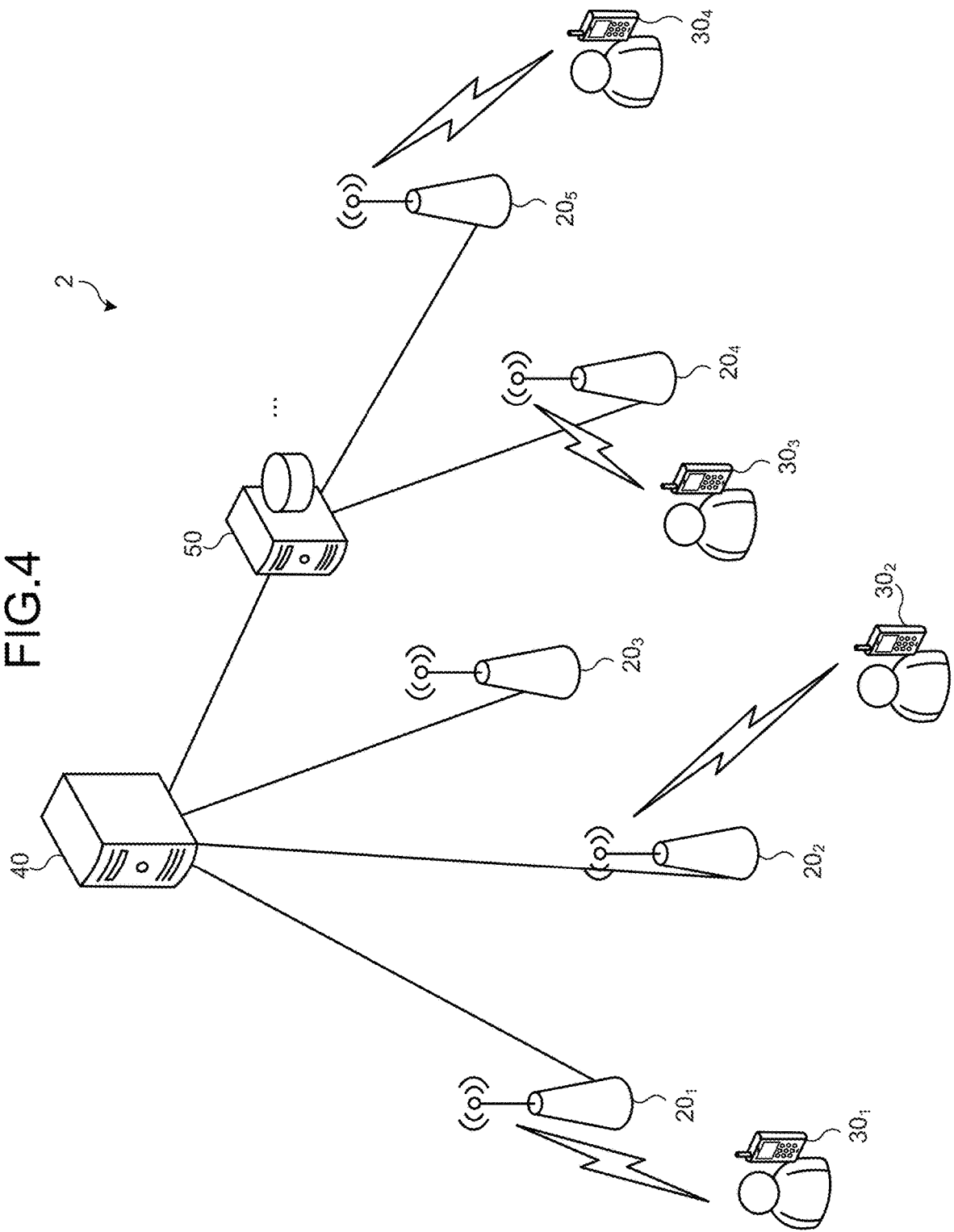
FIG. 4 is a diagram illustrating a configuration example of a communication system according to an embodiment of the present disclosure.

FIG. 4 is a diagram illustrating a configuration example of the communication system 2 according to the embodiment of the present disclosure. The communication system 2 includes the communication device 20, the terminal device 30, and the communication control device 40. The communication system 2 may also include a network manager 50. The communication system 2 provides a radio service to users or devices owned by the users, when the wireless communication devices configuring the communication system 2 operate in a cooperative manner. The wireless communication device is a device having a wireless communication function, and in the example of FIG. 4, the wireless communication device corresponds to the communication device 20 and the terminal device 30. The communication control device 40 may also have a wireless communication function. In this case, the communication control device 40 may also be considered as the wireless communication device. In the following explanation, the wireless communication device may also be simply referred to as a communication device.

The communication system 2 may also include a plurality of the communication devices 20, the terminal devices 30, and the communication control devices 40. In the example of FIG. 4, the communication system 1 includes communication devices $20_1$, $20_2$, $20_3$, $20_4$, $20_5$, and the like, serving as the communication device 20. The communication system 2 also includes terminal devices $30_1$, $30_2$, $30_3$, $30_4$, and the like, serving as the terminal device 30. The communication system 1 includes communication control devices $40_1$, $40_2$, and the like serving as the communication control device 40.

In the following explanation, the communication device (wireless communication device) may also be referred to as a radio system. For example, each of the communication device 10 and the communication devices $20_1$ to $20_5$ is a single radio system. Each of the terminal devices $30_1$ to $30_4$ is a single radio system. The radio system may also be a single system configured by a plurality of the wireless communication devices. For example, a system including one or more communication devices 20 and one or more terminal devices 30 under each of the communication devices 20, may also be considered as a single radio system. Moreover, each of the communication system 1 and the communication system 2 may be considered as a single radio system. In the following explanation, the communication system configured by the wireless communication devices may also be referred to as a wireless communication system, or may simply be referred to as a communication system.

The communication device 20 (second radio system) is a wireless communication device that performs a wireless communication with the terminal device 30 or another communication device 20. For example, the communication device 20 is a device corresponding to a radio base station (such as base station, Node B, eNB, and gNB) and a radio access point (access point). The communication device 20 may also be a radio relay station. Moreover, the communication device 20 may be a light extension device referred to as a remote radio head (RRH). In the present embodiment, the base station of the wireless communication system may be referred to as a base station device. The radio access technology used by the communication device 20 may be a cellular communication technology or a wireless LAN technology. Needless to say, the radio access technology used by the communication device 20 is not limited thereto, and may also be another radio access technology.

The communication device 20 may not necessarily be fixed, and may also be installed in a mobile body such as an automobile. Moreover, the communication device 20 may not necessarily be on the ground, and may also be an object in the air or space such as an aircraft, a drone, a helicopter, and a satellite; or an object over or under the sea such as a vessel and a submarine, provided with a communication device function. In such a case, the communication device 20 can perform wireless communication with another communication device installed in a fixed manner.

The coverage of the communication device 20 may be large in size such as a microcell, or may be small in size such as a picocell. Needless to say, the coverage of the communication device 20 may also be extremely small in size such as a femtocell. When the communication device 20 has beamforming capability, a cell and a service area may be formed for each beam.

The communication device 20 may be used, operated, and managed by various entities. For example, the communication device 20 may be used, operated, and managed by a mobile network operator (MNO), a mobile virtual network operator (MVNO), a mobile virtual network enabler (MVNE), a neutral host network (NHN) operator, an enterprise, an education institution (such as an incorporated educational institution and a municipal education board), a real estate (such as a building and a condominium) manager, an individual, and the like. Needless to say, the entities that use, operate, and manage the communication device 20 are not limited thereto.

The communication device 20 may be installed and operated by a single operator, or may be installed and operated by an individual. Needless to say, the entities that install and operate the communication device 20 are not limited thereto. For example, the communication device 20 may also be installed and operated by a plurality of operators and individuals. Moreover, the communication device 20 may also be a shared facility used by operators or individuals. In this case, the facility may be installed and operated by a third party different from the user.

Typically, the communication device 20 operated by the operator is connected to the Internet via a core network. The communication device 20 is also operated, managed, and maintained by functions referred to as operation, administration, and maintenance (OA&M). For example, the communication device 20 may also include a network manager that integrally controls the communication devices 20 in the network.

The concept of the base station includes an access point and a radio relay station (may also be referred to as a relay station). The concept of the base station not only includes a structure having the function of the base station, but also includes a device installed in the structure. For example, the structure is a building such as an office building, a house, a steel tower, station facilities, airport facilities, port facilities, and a stadium. The concept of the structure not only includes a building, but also includes a non-building structure such as a tunnel, a bridge, a dam, a fence, and a steel pole, and facilities such as a crane, a gate, and a windmill. The concept of the structure not only includes a structure on the ground (land) or underground, but also includes a structure over the water such as a pier and a mega-float, and an underwater structure such as marine observation facilities.

The base station may also be a base station (mobile station) configured in a movable manner. In such a case, the base station (mobile station) may be a wireless communication device installed in a mobile body, or may be a mobile body itself. The mobile body may also be a mobile body that moves on the ground (land) (for example, a vehicle such as an automobile, a bus, a truck, a train, and a linear motor car), or may be a mobile body that moves underground (such as in a tunnel) (for example, a subway). Needless to say, the mobile body may also be a mobile terminal such as a smartphone. The mobile body may also be a mobile body that moves over the water (for example, a ship such as a passenger ship, a cargo ship, and a hovercraft), or a mobile body that moves under the water (for example, a submersible vessel such as a submersible ship, a submarine, and an unmanned diving machine). The mobile body may also be a mobile body that moves within the atmosphere (for example, an aircraft such as an airplane, an airship, and a drone), or a space vehicle that moves outside the atmosphere (for example, an artificial astronomical object such as an artificial satellite, a spacecraft, a space station, and a space probe).

The terminal device 30 is a communication apparatus having a communication function. Typically, the terminal device 30 is a communication apparatus such as a smartphone. The terminal device 30 may also be a user terminal such as a mobile phone, a smart device (a smartphone or a tablet), a wearable terminal, a personal digital assistant (PDA), and a personal computer. The terminal device may also be referred to as a user equipment, a user terminal, a user station, a mobile terminal, a mobile station, and the like.

The terminal device 30 may not necessarily be used by a person. The terminal device 30 may also be a sensor installed in factory machines and buildings used for what is called a machine type communication (MTC). The terminal device 30 may also be a machine to machine (M2M) device or an Internet of Things (IoT) device. As represented by the device-to-device (D2D) and vehicle-to-everything (V2X), the terminal device 30 may also be a device having a relay communication function. The terminal device 30 may also be an apparatus referred to as a client premises equipment (CPE) used in a wireless backhaul and the like. The terminal device 30 may also be a wireless communication device installed in a mobile body, or a mobile body itself.

The terminal device 30 may not necessarily be placed on the ground. The terminal device 30 may also be an object in the air or space such as an aircraft, a drone, a helicopter, and a satellite, or an object over or under the sea such as a vessel and a submarine.

The communication control device 40 is a device that manages the communication device 20. For example, the communication control device 40 is a device for controlling the wireless communication of the communication device 20. For example, the communication control device 40 determines the communication parameters (may also be referred to as operational parameters) used by the communication device 20, and gives permission or instruction to the communication device 20. In such a case, the communication control device 40 may also be a network manager that integrally controls the radio devices in the network. For example, in ETSI EN 303 387 and IEEE 802.19.1-2014, the communication control device 40 may be a control device such as a spectrum manager/coexistence manager that performs radio wave interference control between the radio apparatuses. Moreover, for example, the communication control device 40 may also be a registered location secure server (RLSS) defined in IEEE 802.11-2016. Furthermore, in the spectrum sharing environment, the communication control device 40 may also be a database (a database server, a device, and a system) such as a geolocation database (GLDB) and a spectrum access system (SAS). Basically, the communication control device 40 controls the communication device 20. However, the communication control device 40 may also control the terminal device 30 under the communication device 20.

Figure 5:
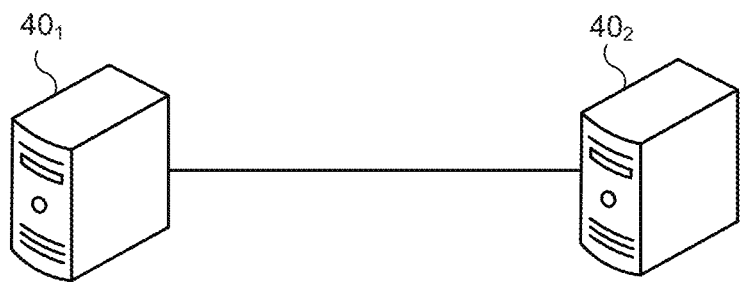
FIG. 5 is a diagram illustrating a model in which communication control devices are arranged in a dispersed manner.

A single communication system 2 may also include a plurality of the communication control devices 40. FIG. 5 is a diagram illustrating a model in which the communication control devices 40 are arranged in a dispersed manner. In this case, the communication control devices 40 (in the example of FIG. 5, the communication control device $40_1$ and the communication control device $40_2$) exchange information on the communication device 20 that is managed by the communication control device $40_1$ and the communication control device $40_2$. The communication control device $40_1$ and the communication control device $40_2$ then allocate the required frequencies and calculate interference control.

Figure 6:
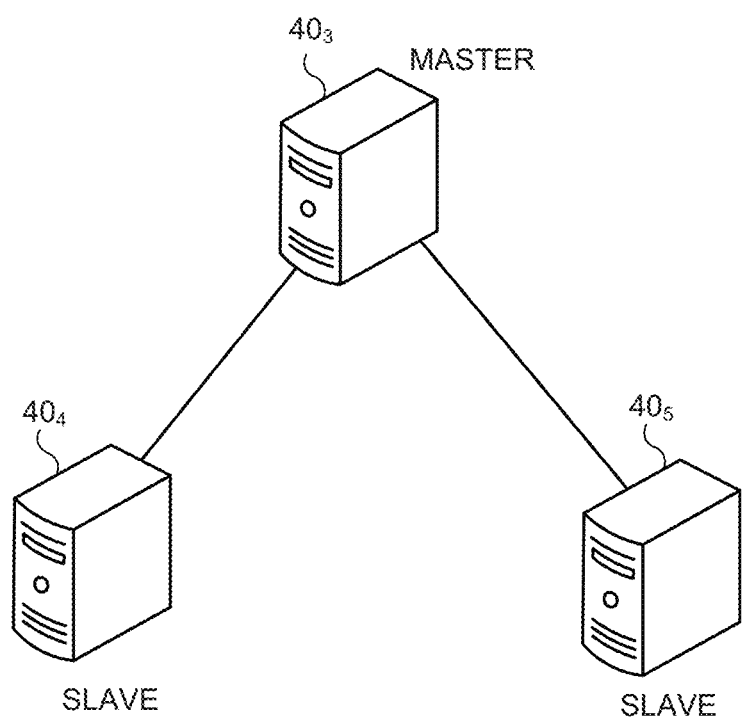
FIG. 6 is a diagram illustrating a model in which one communication control device controls a plurality of communication control devices in a centrally controlled manner.

The communication control device 40 may also be a master/slave type device. FIG. 6 is a diagram illustrating a model (what is called a master/slave type model) in which one communication control device controls a plurality of communication control devices in a centrally controlled manner. In the example of FIG. 6, the communication control device $40_3$ is a master communication control device, and the communication control devices $40_4$ and $40_5$ are slave communication control devices. In case of such a system, the master communication control device can integrate a plurality of the slave communication control devices, and make decisions intensively. The master communication control device can also delegate or denounce the decision making authority with respect to the slave communication control devices to distribute load (balance load) and the like.

Because of the role, the communication control device 40 can also acquire required information from the entities other than the communication device 20 and the terminal device 30. More specifically, for example, the communication control device 40 can acquire information required for protecting the primary system such as the position information, from the database (regulatory database) managed and operated by the radio wave administration of the country or region. For example, the regulatory database includes a Universal Licensing System (ULS) operated by the US Federal Communications Commissions and the like. For example, the information required for protecting the primary system may also include an out-of-band emission (OOBE) limit, an adjacent channel leakage ratio (ACLR), an adjacent channel selectivity, a fading margin, a protection ratio (PR), and/or like. When numerical values are fixedly given, it is preferable to use the numerical values, legislatively.

As another example, radio sensing information may also be acquired from a radio sensing system that is installed and operated to detect the radio waves of the primary system. As a specific example, radio wave detection information of the primary system may be acquired from a radio sensing system such as an Environmental Sensing Capability (ESC) in the US CBRS. When the communication device or the terminal has a sensing function, the radio wave detection information of the primary system may also be acquired therefrom.

An interface between the entities may be either wired or wireless. For example, an interface between the communication control device and the communication device is not limited to a wire circuit, but may also be a wireless interface that does not depend on spectrum sharing (for example, a wireless interface provided via a licensed band by a mobile network operator or a Wi-Fi communication using an existing license-exempt band.

Hereinafter, a configuration of each device configuring the communication system 2 will be described in detail.

2-2. Configuration of Communication Device

Figure 7:
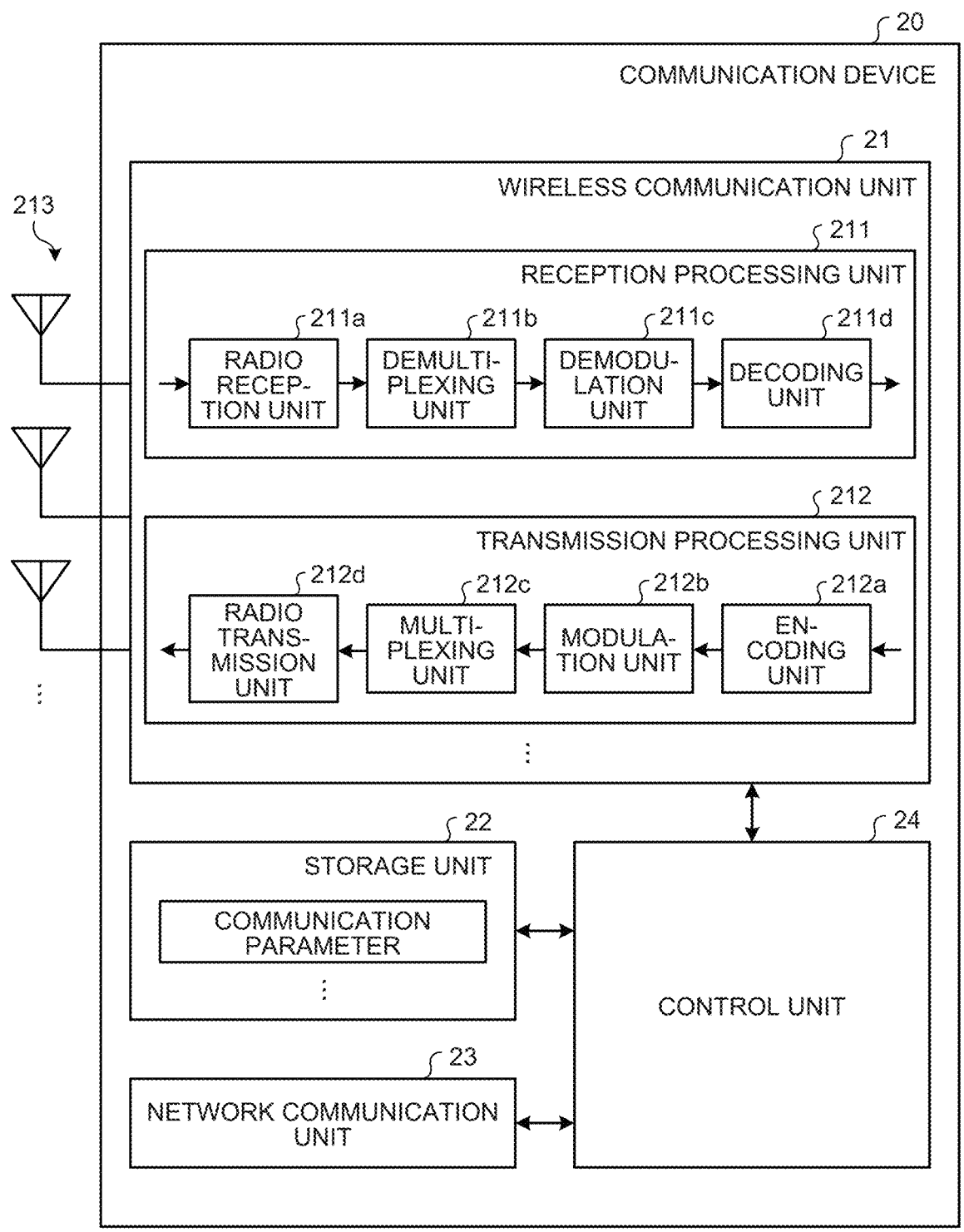
FIG. 7 is a diagram illustrating a configuration example of a communication device according to the embodiment of the present disclosure.

First, a configuration of the communication device 20 will be described. FIG. 7 is a diagram illustrating a configuration example of the communication device 20 according to the embodiment of the present disclosure. The communication device 20 is a wireless communication device (radio system) that performs a wireless communication with the terminal device 30 under the control of the communication control device 40. For example, the communication device 20 is a base station device (ground station device) located on the ground. In such a case, the communication device 20 may be a base station device placed in a structure on the ground, or a base station device installed in a mobile body that moves on the ground. More specifically, the communication device 20 may be an antenna installed on a structure such as a building, and a signal processing device connected to the antenna. Needless to say, the communication device 20 may also be a structure or a mobile body itself. "On the ground" does not literally means on the ground (land) but means on the ground in a broad sense including underground, over the water, and under the water.

The communication device 20 is not limited to the ground station device. For example, the communication device 20 may also be a base station device (non-ground station device) that moves or floats in the air or space. In such a case, the communication device 20 may also be an aircraft station device or a satellite station device.

The aircraft station device may be a device mounted on an aircraft and the like, or an aircraft itself. The concept of the aircraft not only includes a heavy aircraft such as an airplane and a glider, but also includes a light aircraft such as a balloon and an airship. The concept of the aircraft also includes a rotorcraft such as a helicopter and an autogiro. The aircraft station device (or an aircraft on which an aircraft station device is mounted) may be a manned aircraft, or an unmanned aircraft such as a drone.

The satellite station device may be a device mounted on a space vehicle such as an artificial satellite, or a space vehicle itself. A satellite to be the satellite station device may be any one of a low earth orbiting (LEO) satellite, a medium earth orbiting (MEO) satellite, a geostationary earth orbiting (GEO) satellite, and a highly elliptical orbiting (HEO) satellite. Needless to say, the satellite station device may also be a device mounted on the LEO satellite, the MEO satellite, the GEO satellite, or the HEO satellite.

The communication device 20 may also be a relay station device. For example, the relay station device is an aeronautical station and an earth station. The relay station device can be considered as one type of the relay devices described above. The aeronautical station is a radio station installed on the ground or in a mobile body that moves on the ground, to communicate with an aircraft station device. The earth station is a radio station located on the earth (includes in the air) to communicate with a satellite station device. The earth station may be a large earth station, or a small earth station such as a very small aperture terminal (VSAT). The earth station may also be a VSAT control earth station (may also be referred to as a master station or a HUB station), or a VSAT earth station (may also be referred to as a slave station). The earth station may also be a radio station installed in a mobile body that moves on the ground. For example, the earth station mounted on a ship includes earth stations on board vessels (ESVs). The earth station may also include an aircraft earth station installed in an aircraft (including a helicopter) and that communicates with a satellite station. The earth station may also include an aeronautical earth station that is installed in a mobile body that moves on the ground, and that communicates with an aircraft earth station via a satellite station. The relay station device may also be a portable and movable radio station that communicates with the satellite station and the aircraft station.

The communication device 20 includes a wireless communication unit 21, a storage unit 22, a network communication unit 23, and a control unit 24. The configuration illustrated in FIG. 7 is a functional configuration, and the hardware configuration may be different therefrom. The function of the communication device 20 may be implemented on a plurality of physically separated devices in a dispersed manner.

The wireless communication unit 21 is a wireless communication interface that performs a wireless communication with another communication device (for example, the terminal device 30, the communication control device 40, and another communication device 20). The wireless communication unit 21 is operated according to the control of the control unit 24. The wireless communication unit 21 may correspond to a plurality of radio access technologies. For example, the wireless communication unit 21 may correspond to both NR and LTE. The wireless communication unit 21 may also correspond to another cellular communication scheme such as W-CDMA and cdma 2000. In addition to the cellular communication scheme, the wireless communication unit 21 may also correspond to a wireless LAN communication scheme. Needless to say, the wireless communication unit 21 may only correspond to one radio access technology.

The wireless communication unit 21 includes a reception processing unit 211, a transmission processing unit 212, and an antenna 213. The wireless communication unit 21 may also include a plurality of the reception processing units 211, the transmission processing units 212, and the antennas 213. When the wireless communication unit 21 corresponds to a plurality of radio access technologies, each unit of the wireless communication unit 21 may be individually configured for each radio access technology. For example, when the communication device 20 corresponds to NR and LTE, the reception processing unit 211 and the transmission processing unit 212 may be individually configured for NR and LTE.

The reception processing unit 211 processes an uplink signal received via the antenna 213. The reception processing unit 211 includes a radio reception unit 211a, a demultiplexing unit 211b, a demodulation unit 211c, and a decoding unit 211d.

The radio reception unit 211a performs down conversion, removal of unnecessary frequency components, amplification level control, orthogonal demodulation, conversion into a digital signal, removal of a guard interval, and extraction of a frequency domain signal by fast Fourier transform, on the uplink signal. For example, it is assumed that the radio access technology of the communication device 20 is a cellular communication scheme such as LTE. In such a case, the demultiplexing unit 211b separates an uplink channel such as a physical uplink shared channel (PUSCH) and a physical uplink control channel (PUCCH), and an uplink reference signal, from a signal output from the radio reception unit 211a. The demodulation unit 211c demodulates a reception signal for a modulation symbol of the uplink channel, using a modulation scheme such as binary phase shift keying (BPSK) and quadrature phase shift keying (QPSK). The modulation scheme used by the demodulation unit 211c may also be a 16 quadrature amplitude modulation (QAM), a 64 QAM, or a 256 QAM. The decoding unit 211d performs a decoding process on encoded bits of the demodulated uplink channel. The decoded uplink data and uplink control information are output to the control unit 24.

The transmission processing unit 212 transmits downlink control information and downlink data. The transmission processing unit 212 includes an encoding unit 212a, a modulation unit 212b, a multiplexing unit 212c, and a radio transmission unit 212d.

The encoding unit 212a encodes the downlink control information and downlink data input from the control unit 24, using an encoding scheme such as block coding, convolutional coding, and turbo coding. The modulation unit 212b modulates the encoded bits output from the encoding unit 212a using a predetermined modulation scheme such as BPSK, QPSK, 16 QAM, 64 QAM, and 256 QAM. The multiplexing unit 212c multiplexes the modulation symbol and the downlink reference signal of each channel, and arranges the multiplexed result in a predetermined resource element. The radio transmission unit 212d performs various types of signal processing on the signal from the multiplexing unit 212c. For example, the radio transmission unit 212d performs processes such as conversion to the time domain by fast Fourier transform, addition of a guard interval, generation of a baseband digital signal, conversion into an analog signal, orthogonal modulation, up conversion, removal of excess frequency components, and amplification of electric power. The signal generated by the transmission processing unit 212 is transmitted from the antenna 213.

The storage unit 22 is a storage device that can read and write data such as dynamic random access memory (DRAM), static random access memory (SRAM), flash memory, and hard disk. The storage unit 22 functions as a storage unit for the communication device 20. The storage unit 22 stores therein desired transmission power information, operational parameters, holding resource information, and the like.

The desired transmission power information is information on transmission power requested from the communication device 20 to the communication control device 40, as the information on transmission power required for transmitting radio waves.

The operational parameters are information (for example, setting information) on the radio wave transmission operation of the communication device 20. For example, the operational parameters are information on maximum value of the transmission power (maximum allowable transmission power) allowed to the communication device 20. Needless to say, the operational parameters are not limited to the information on maximum allowable transmission power.

The holding resource information is information on radio resources held by the communication device 20. For example, the holding resource information is information on radio resources that can be currently used by the communication device 20. For example, the holding resource information is holding amount information of the interference margin allocated to the communication device 20 from the communication control device 40. The holding amount information may also be information on a resource block unit, which will be described below. In other words, the holding resource information may also be information on a resource block (for example, resource block holding amount) held by the communication device 20.

The network communication unit 23 is a communication interface used for communicating with another device. For example, the network communication unit 23 is a local area network (LAN) interface such as a network interface card. The network communication unit 23 may also be a universal serial bus (USB) host controller, and a USB interface including a USB port and the like. The network communication unit 23 may also be a wired interface or a wireless interface. The network communication unit 23 functions as a network communication unit for the communication device 20. The network communication unit 23 communicates with another device according to the control of the control unit 24.

The control unit 24 is a controller that controls the units in the communication device 20. For example, the control unit 24 is implemented by a processor such as a central processing unit (CPU) and a micro processing unit (MPU). For example, the control unit 24 is implemented when the processor executes various programs stored in the storage device in the communication device 20, using a random access memory (RAM) and the like as a work area. The control unit 24 may also be implemented by an integrated circuit such as an application specific integrated circuit (ASIC) and a field programmable gate array (FPGA). The CPU, MPU, ASIC, and FPGA may all be considered as controllers.

As illustrated in FIG. 7, the control unit 24 includes a generation unit 241, a transmission unit 242, and a reception unit 243. Each of the blocks configuring the control unit 24 (generation unit 241 to reception unit 243) is a functional block indicating the function of the control unit 24. The functional blocks may be software blocks or hardware blocks. For example, each of the functional blocks described above may be a single software module implemented by software (including a micro program), or a single circuit block on a semiconductor chip (die). Needless to say, each of the functional blocks may also be a single processor or a single integrated circuit. The configuration method of the functional blocks is optional. The control unit 24 may also be formed of functional units different from the functional blocks described above. The operation of the blocks (generation unit 241 to reception unit 243) configuring the control unit 24 will be described in detail in the communication control process and the like, which will be described below.

2-3. Configuration of Terminal Device

Figure 8:
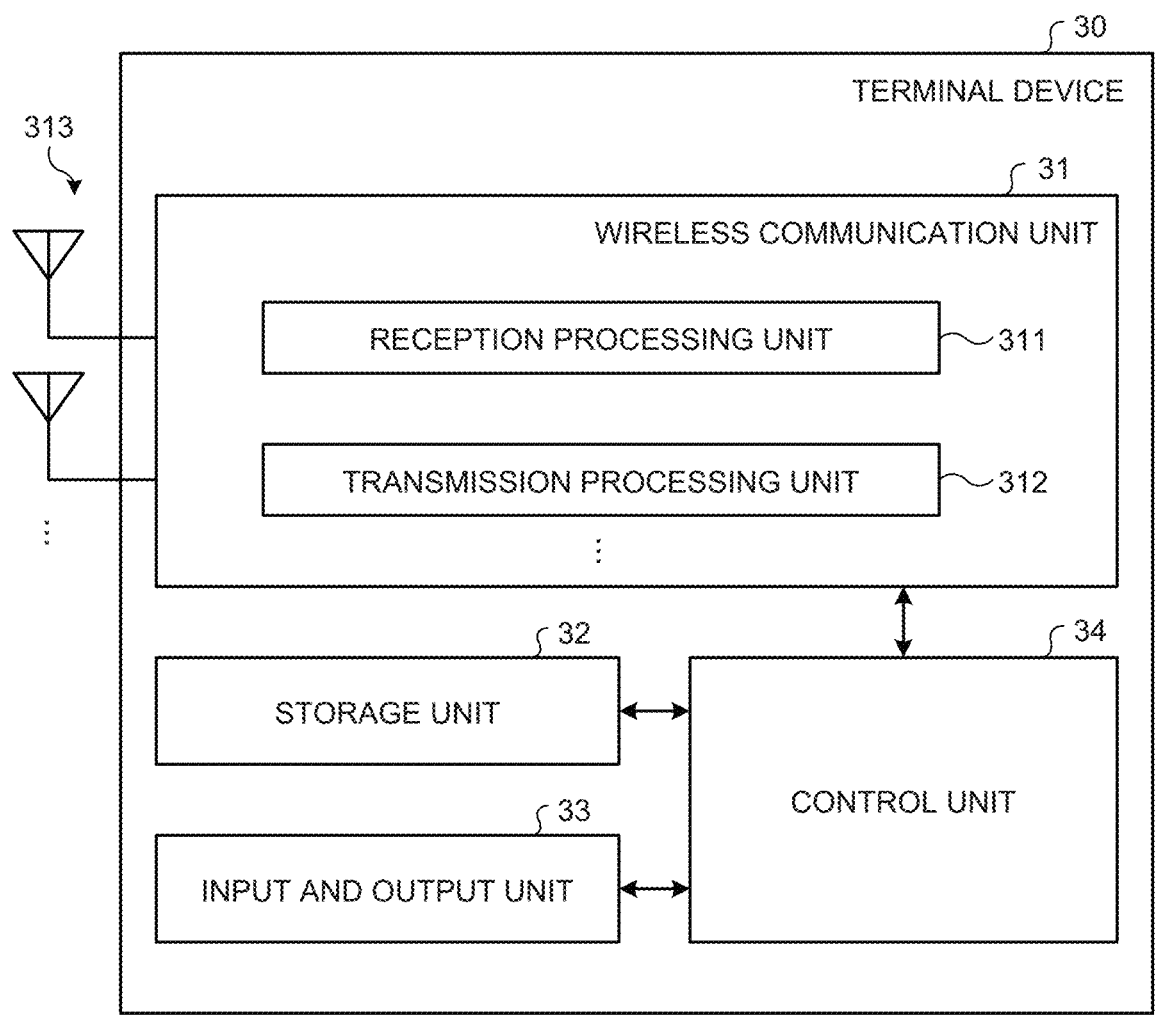
FIG. 8 is a diagram illustrating a configuration example of a terminal device according to the embodiment of the present disclosure.

Next, a configuration of the terminal device 30 will be described. FIG. 8 is a diagram illustrating a configuration example of the terminal device 30 according to the embodiment of the present disclosure. The terminal device 30 is a communication device that performs a wireless communication with the communication device 20 and the communication control device 40. In the present embodiment, the concept of the communication device (wireless communication device) not only includes the base station device but also includes the terminal device. The communication device may also be referred to as a radio system.

The terminal device 30 includes a wireless communication unit 31, a storage unit 32, an input and output unit 33, and a control unit 34. The configuration illustrated in FIG. 8 is a functional configuration, and the hardware configuration may be different therefrom. Moreover, the function of the terminal device 30 may be implemented on a plurality of physically separated configurations in a dispersed manner.

The wireless communication unit 31 is a wireless communication interface that performs a wireless communication with another communication device (for example, the communication device 20 and another terminal device 30). The wireless communication unit 31 is operated according to the control of the control unit 34. The wireless communication unit 31 corresponds to one or more radio access technologies. For example, the wireless communication unit 31 corresponds to both NR and LTE. The wireless communication unit 31 may also correspond to another radio access technology such as W-CDMA and cdma 2000.

The wireless communication unit 31 includes a reception processing unit 311, a transmission processing unit 312, and an antenna 313. The wireless communication unit 31 may also include a plurality of the reception processing units 311, the transmission processing units 312, and the antennas 313. When the wireless communication unit 31 corresponds to a plurality of radio access technologies, each unit of the wireless communication unit 31 may be individually configured for each radio access technology. For example, the reception processing unit 311 and the transmission processing unit 312 may be individually configured for LTE and NR. The configurations of the reception processing unit 311 and the transmission processing unit 312 may be the same as those of the reception processing unit 211 and the transmission processing unit 212 of the communication device 20.

The storage unit 32 is a storage device that can read and write data such as DRAM, SRAM, flash memory, and hard disk. The storage unit 32 functions as a storage unit for the terminal device 30.

The input and output unit 33 is a user interface for exchanging information with a user. For example, the input and output unit 33 is an operating device used by a user to perform various operations such as a keyboard, a mouse, an operation key, and a touch panel. The input and output unit 33 is also a display device such as a liquid crystal display and an organic electroluminescence (EL) display. The input and output unit 33 may also be an acoustic device such as a speaker and a buzzer. The input and output unit 33 may also be a lighting device such as a light emitting diode (LED) lamp. The input and output unit 33 functions as an input and output unit (an input unit, an output unit, an operation unit, or a notification unit) for the terminal device 30.

The control unit 34 is a controller that controls the units in the terminal device 30. For example, the control unit 34 is implemented by a processor such as a CPU and an MPU. For example, the control unit 34 is implemented when the processor executes various programs stored in the storage device in the terminal device 30, using the RAM and the like as a work area. The control unit 34 may also be implemented by an integrated circuit such as an ASIC and a FPGA. The CPU, MPU, ASIC, and FPGA may all be considered as controllers.

2-4. Configuration of Communication Control Device

The communication control device 40 is a device for controlling the wireless communication of the communication device 20. The communication control device 40 may also control the wireless communication of the terminal device 30 via the communication device 20, or directly. For example, the communication control device 40 is a network manager that integrally controls the radio device in the network. For example, the communication control device 40 is a spectrum manager/coexistence manager. The communication control device 40 may also be a database server such as a geolocation database (GLDB) and a spectrum access system (SAS). The network manager 50 may also have the same configuration as that of the communication control device 40.

When the communication system 2 is the cellular communication system, the communication control device 40 may be a device configuring a core network. For example, a core network CN is an evolved packet core (EPC) and a 5G core network (5GC). For example, when the core network is the EPC, the communication control device 40 may be a device that functions as a mobility management entity (MME). For example, when the core network is the 5GC, the communication control device 40 may be a device that functions as an access and mobility management function (AMF). Even when the communication system 2 is the cellular communication system, the communication control device 40 may not necessarily be a device configuring the core network. For example, the communication control device 40 may also be a device that functions as a radio network controller (RNC).

The communication control device 40 may also function as a gateway. For example, when the core network is the EPC, the communication control device 40 may be a device that functions as a serving gateway (S-GW) or a packet data network gateway (P-GW). When the core network is the 5GC, the communication control device 40 may also be a device that functions as a user plane function (UPF). The communication control device 40 may not necessarily be a device configuring the core network. For example, when the core network is a core network of the W-CDMA or cdma 2000, the communication control device 40 may also be a device that functions as a radio network controller (RNC).

The communication control device 40 may also be a system that controls a plurality of secondary systems. In this case, it is possible to consider the communication system 2 as a system including the secondary systems.

Figure 9:
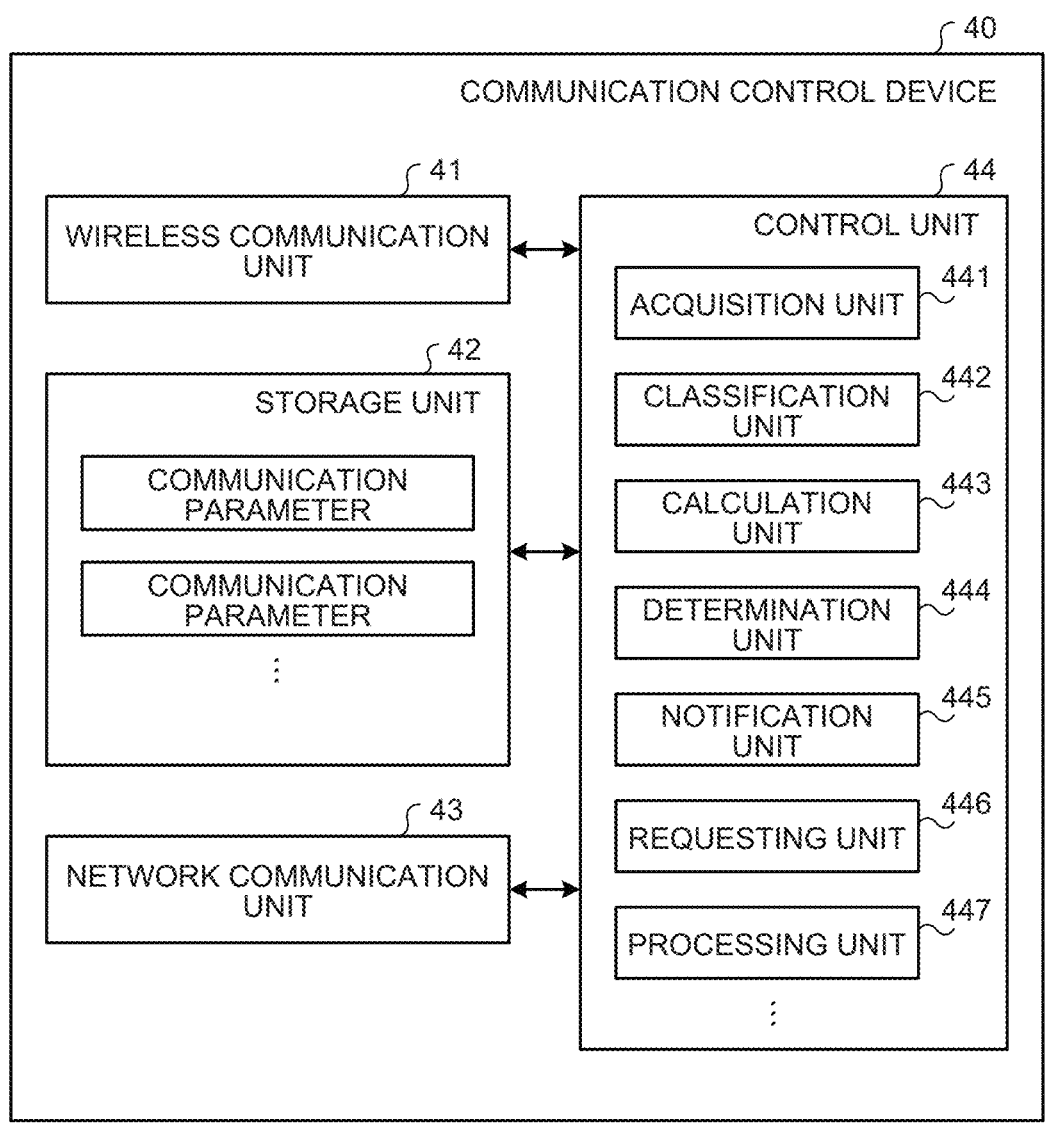
FIG. 9 is a diagram illustrating a configuration example of a communication control device according to the embodiment of the present disclosure.

FIG. 9 is a diagram illustrating a configuration example of the communication control device 40 according to the embodiment of the present disclosure. The communication control device 40 includes a wireless communication unit 41, a storage unit 42, a network communication unit 43, and a control unit 44. The configuration illustrated in FIG. 9 is a functional configuration, and the hardware configuration may be different therefrom. The function of the communication control device 40 may be implemented on a plurality of physically separated configurations in a dispersed manner. For example, the communication control device 40 may be configured by a plurality of server devices.

The wireless communication unit 41 is a wireless communication interface that performs a wireless communication with another communication device (for example, the communication device 20, the terminal device 30, and another communication control device 40). The wireless communication unit 41 is operated according to the control of the control unit 44. The wireless communication unit 31 corresponds to one or more radio access technologies. For example, the wireless communication unit 31 corresponds to both NR and LTE. The wireless communication unit 31 may also correspond to another radio access technology such as W-CDMA and cdma 2000. The configuration of the wireless communication unit 41 is the same as that of the wireless communication unit 21 of the communication device 20.

The storage unit 42 is a storage device that can read and write data such as DRAM, SRAM, flash memory, and hard disk. The storage unit 22 functions as a storage unit for the communication device 20. The storage unit 22 stores therein operational parameters of the communication devices 20 configuring the communication system 2. The storage unit 22 may also store therein holding resource information of the communication devices 20 configuring the communication system 2. As described above, the holding resource information is information on radio resources held by the communication device 20.

The network communication unit 43 is a communication interface used for communicating with another device. The network communication unit 43 may be a network interface, or a device connection interface. For example, the network communication unit 43 may be a local area network (LAN) interface such as a network interface card (NIC). The network communication unit 43 may also be a universal serial bus (USB) host controller, or a USB interface including a USB port and the like. The network communication unit 43 may also be a wired interface or a wireless interface. The network communication unit 43 functions as a communication unit for the communication control device 40. The network communication unit 43 communicates with the communication device 20 and the terminal device 30 according to the control of the control unit 44.

The control unit 44 is a controller that controls the units in the communication control device 40. For example, the control unit 44 is implemented by a processor such as a CPU and an MPU. For example, the control unit 44 is implemented when the processor executes various programs stored in the storage device in the communication control device 40 using the RAM and the like as a work area. The control unit 44 may also be implemented by an integrated circuit such as an ASIC and a FPGA. The CPU, MPU, ASIC, and FPGA may all be considered as controllers.

As illustrated in FIG. 9, the control unit 44 includes an acquisition unit 441, a classification unit 442, a calculation unit 443, a determination unit 444, a notification unit 445, a requesting unit 446, and a processing unit 447. Each of the blocks (acquisition unit 441 to processing unit 447) configuring the control unit 44 is a functional block indicating the function of the control unit 44. The functional block may be a software block or a hardware block. For example, each of the functional blocks described above may be a single software module implemented by software (including a micro program), or a single circuit block on a semiconductor chip (die). Needless to say, each of the functional blocks may also be a single processor or a single integrated circuit. The configuration method of the functional block is optional. The control unit 44 may also be configured by functional units different from the functional blocks described above. The operation of the blocks (acquisition unit 441 to processing unit 447) configuring the control unit 44 will be described in detail in the communication control process and the like, which will be described below.

3. Interference Model

Figure 10:
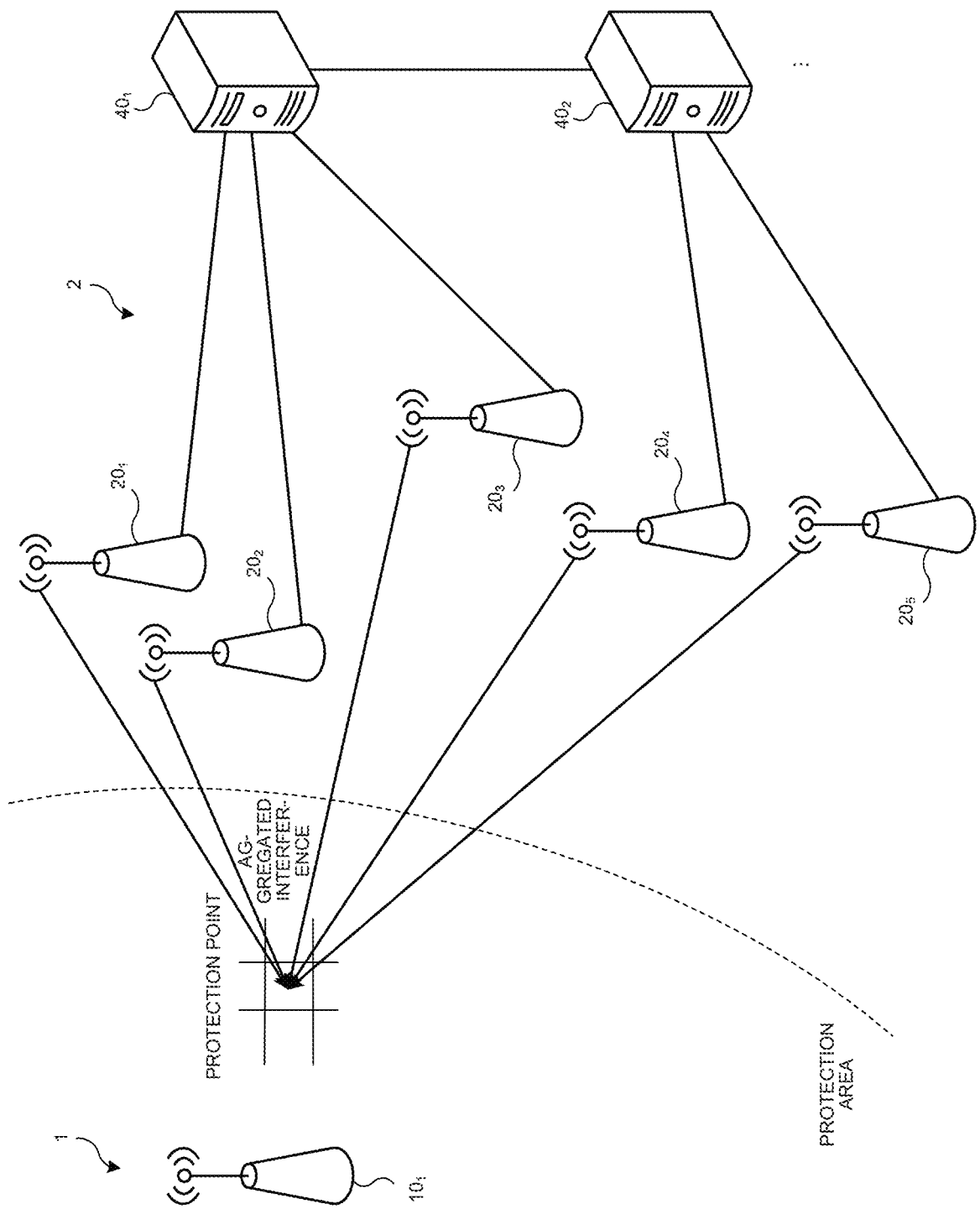
FIG. 10 is an explanatory diagram illustrating an example of an interference model assumed in the present embodiment.

Next, an interference model assumed in the present embodiment will be described. FIG. 10 is an explanatory diagram illustrating an example of an interference model assumed in the present embodiment. For example, the interference model illustrated in FIG. 10 is applied when the primary system has a service area. In the example of FIG. 10, the communication system 1 (primary system) is a wireless communication system having a service area. For example, the service area is a protection area of the communication system 1. A plurality of interference calculation reference points (hereinafter, referred to as protection points) are set in the protection area. For example, the protection points are set by the operator of the communication system 1, a public authorities managing the radio waves, or the like (hereinafter, referred to as a manager). For example, the manager may divide the protection area into a lattice shape, and set the center of a predetermined lattice as a protection point. The determination method of the protection point is optional. The interference margin of each protection point is set by the manager and the like. FIG. 10 illustrates interference applied to the protection point, from the communication devices 20 configuring the communication system 2 (secondary system). The communication control device 40 of the communication system 2 controls the transmission power of the communication devices 20 so that the aggregated interference at each protection point does not exceed the set interference margin.

Figure 11:
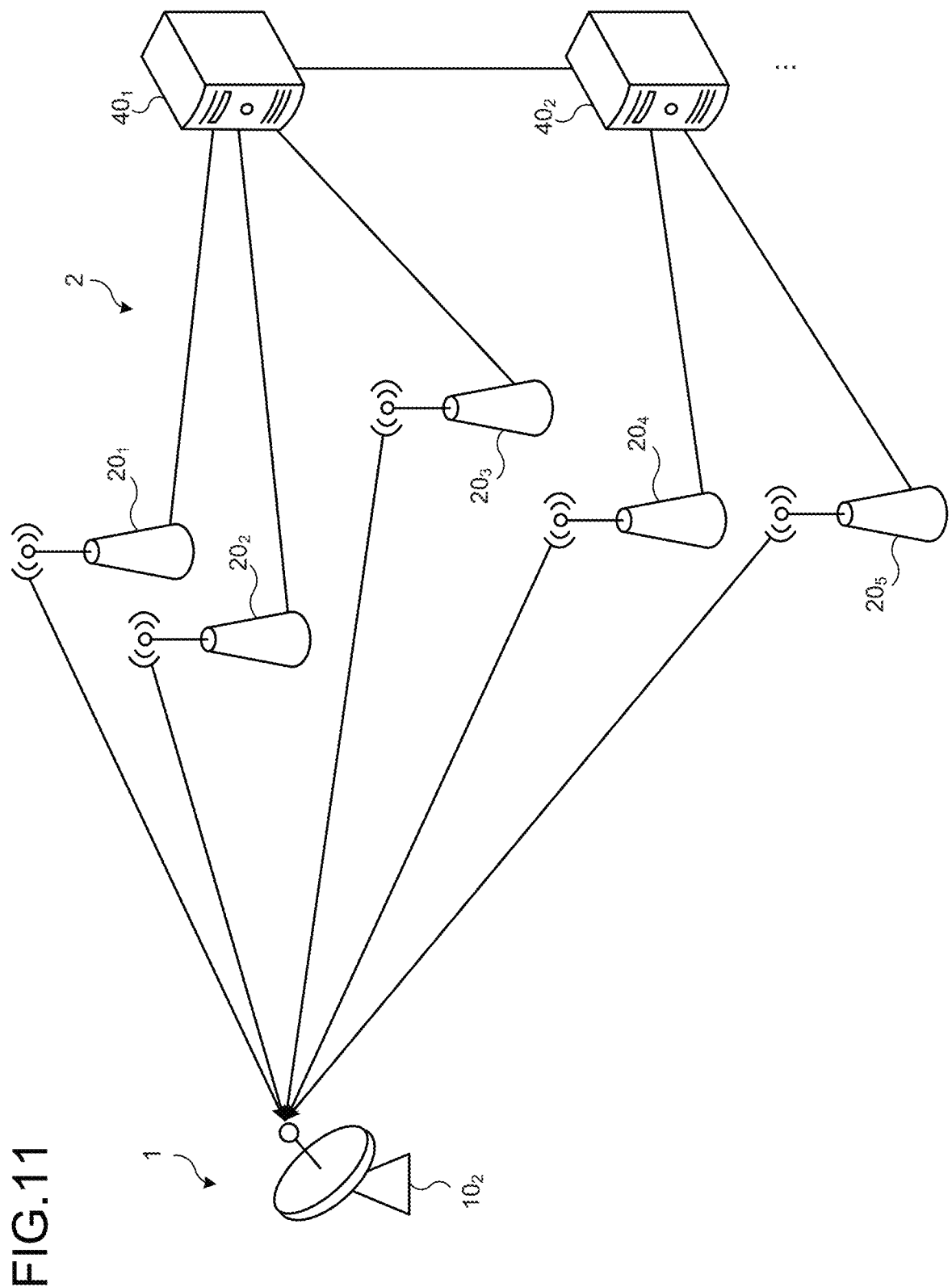
FIG. 11 is an explanatory diagram illustrating another example of the interference model assumed in the present embodiment.

FIG. 11 is an explanatory diagram illustrating another example of the interference model assumed in the present embodiment. For example, the interference model illustrated in FIG. 11 is applied when the primary system is only used for reception. In the example of FIG. 11, the communication system 1 (primary system) has a reception antenna serving as a communication device 102. For example, the communication device 102 is a reception antenna of a satellite ground station. The communication control device 40 of the communication system 2 sets the position of the reception antenna as a protection point, and controls the transmission power of the communication devices 20 so that the aggregated interference at the point does not exceed the interference margin.

4. Method for Protecting Primary System

Next, a method for protecting a primary system will be explained. As described above, for example, the method for protecting the primary system can be classified into the following two types.

1. Interference Margin Batch Allocation Type
2. Interference Margin Iterative Allocation Type For example, the method for protecting a primary system of an interference margin batch allocation type includes a technique disclosed in Non Patent Literature 3 (for example, a calculation technique of the maximum allowable EIRP). For example, the method for protecting a primary system of an interference margin iterative allocation type includes an iterative allocation process (IAP) disclosed in Non Patent Literature 6.

Hereinafter, the method for protecting the primary system of the "interference margin batch allocation type" and the method for protecting the primary system of the "interference margin iterative allocation type" will be described.

4-1. Interference Margin Batch Allocation Type

Figure 12:
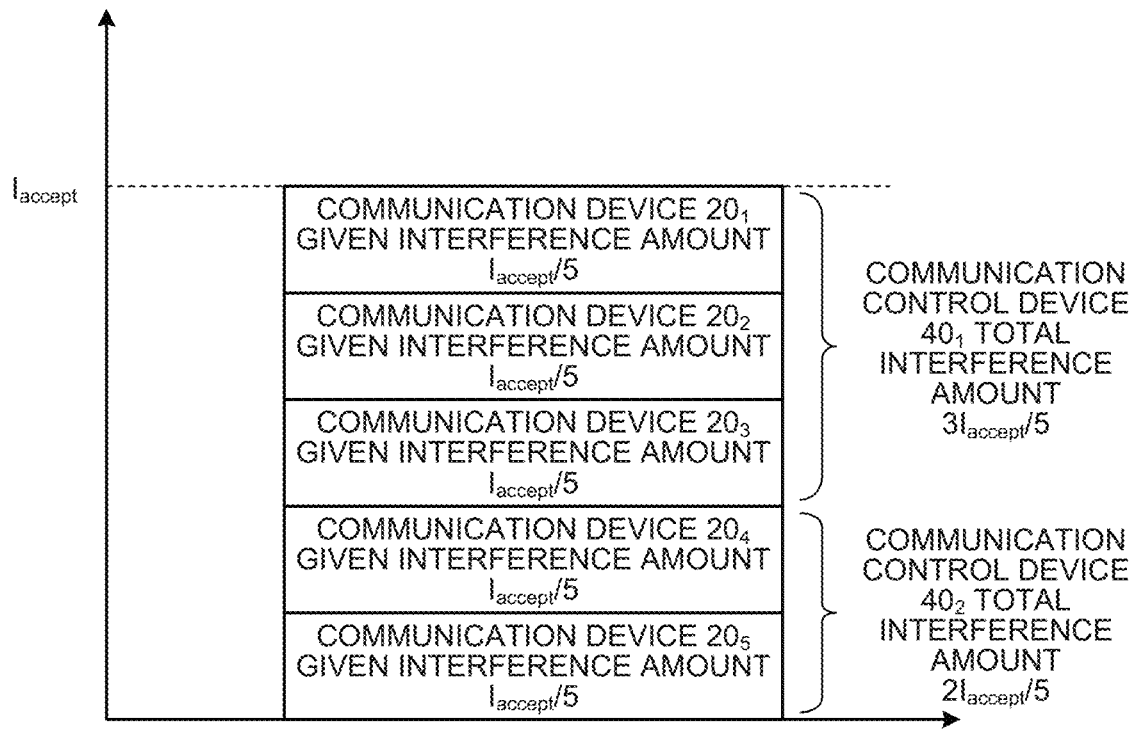
FIG. 12 is a diagram for explaining a method for protecting a primary system of an interference margin batch allocation type.

First, the method for protecting the primary system of the interference margin batch allocation type will be described. FIG. 12 is a diagram for explaining the method for protecting the primary system of the interference margin batch allocation type. As described above, in the interference margin batch allocation type, the communication control device 40 calculates the maximum allowable transmission power of the secondary system, using a "value uniquely calculated from the positional relation between the protection reference point of the primary system and the secondary system", as a reference value. In the example of FIG. 12, an allowable interference threshold of the primary system is $I_{accept}$. The threshold may be an actual threshold, or may be a value set by taking some margins (for example, a protection ratio) into consideration from the actual threshold, by taking a calculation error and interference variation into account.

In the method for protecting the primary system of the interference margin batch allocation type, the interference control means to determine the transmission power of the radio device (EIRP, conducted power+antenna gain, and the like) so as not to exceed the allowable interference threshold. When there are a number of the communication devices 20, and when each of the communication devices 20 is made not to exceed the allowable interference threshold, the interference power received by the communication system 1 (primary system) may exceed the allowable interference threshold. Thus, the interference margin (allowable interference amount) is "allocated", on the basis of the number of the communication devices 20 registered in the communication control device 40.

For example, in the example of FIG. 12, the total number of the communication devices 20 is five. Thus, the allowable interference amount of $I_{accept}/5$ is allocated to each of the communication devices 20. Because the communication device 20 itself cannot recognize the allocation amount, the communication device 20 acquires the transmission power recognized through the communication control device, or the transmission power determined on the basis of the allocation amount. Because the communication control device cannot recognize the number of radio devices managed by the other communication control device, the communication control devices can recognize the total number of the radio devices and allocate the allowable interference amount, by exchanging information with each other. For example, the allowable interference amount of $3I_{accept}/5$ is allocated to the communication control device $40_1$.

Figure 13:
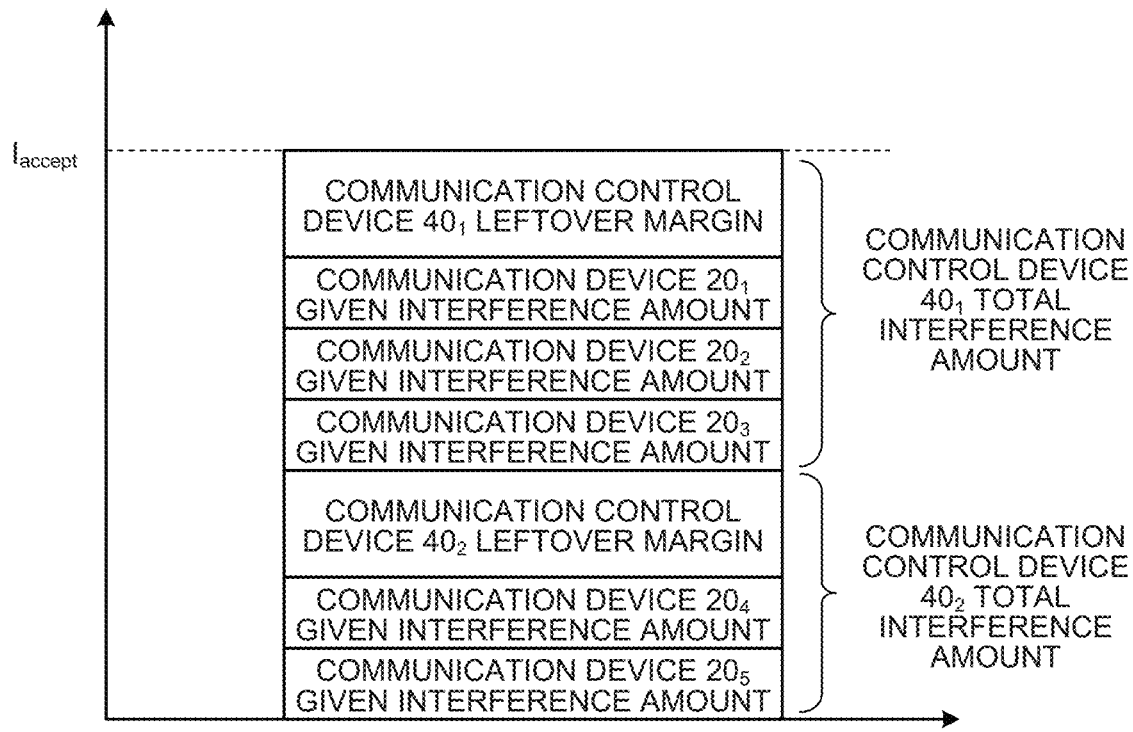
FIG. 13 is a diagram illustrating a state when a leftover margin is generated.

In this technique, the interference margin not used by the communication device 20 may become a leftover margin. FIG. 13 is a diagram illustrating a state when a leftover margin is generated. FIG. 13 illustrates the total interference amount set for each of the two communication control devices 40 (communication control devices $40_1$ and $40_2$). FIG. 13 also illustrates the interference amount (given interference amount) applied to a predetermined protection point of the communication system 1 from the communication devices 20 (communication devices $20_1$ to $20_3$) managed by the two communication control devices 40. An interference amount obtained by subtracting the interference amount of the communication device 20 from the total interference amounts of the two communication control devices 40 is a leftover margin. In the following explanation, the remained interference amount is referred to as a leftover margin. The leftover margin may also be referred to as a leftover interference amount.

4-2. Interference Margin Iterative Allocation Type

Figure 14:
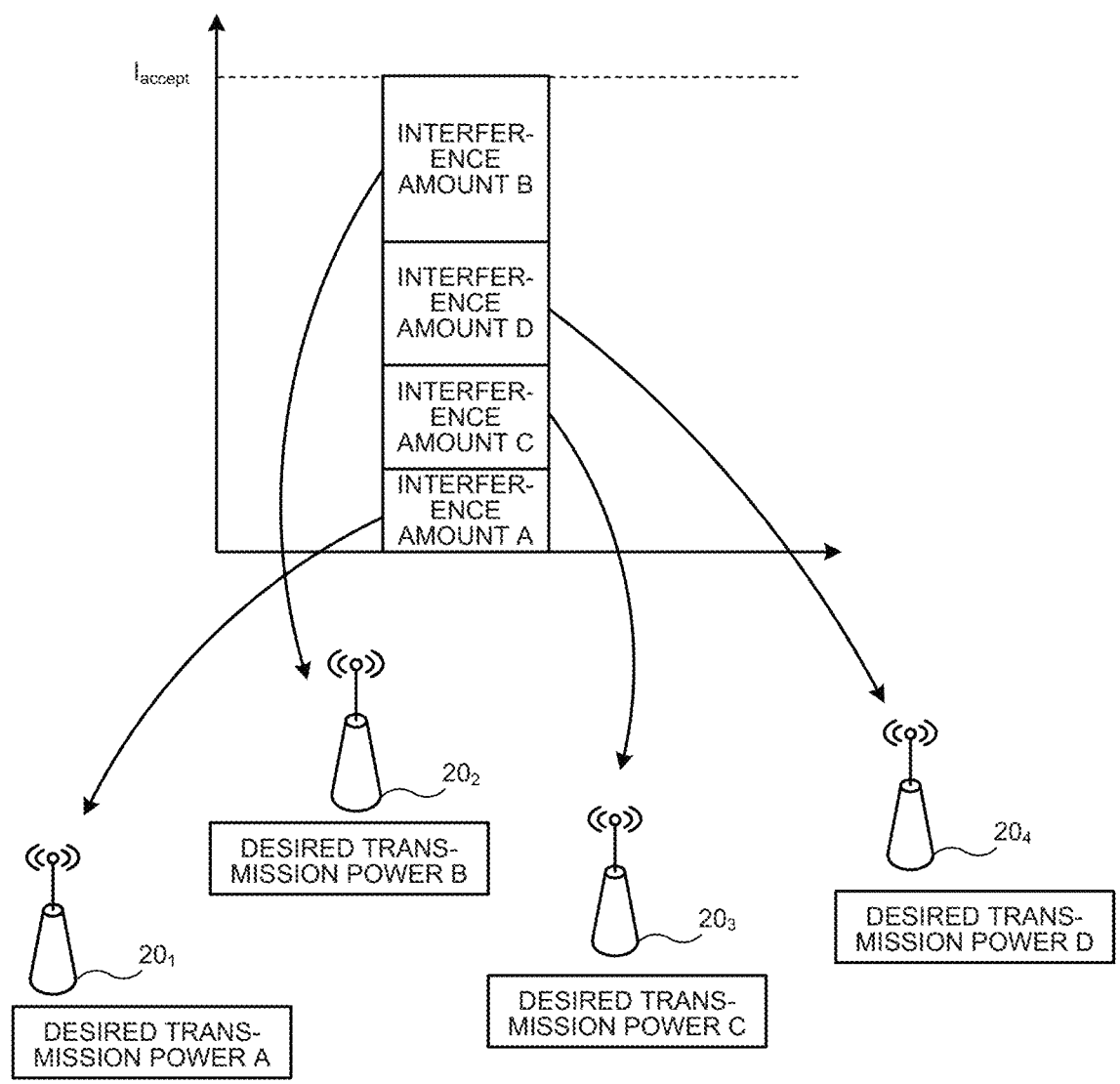
FIG. 14 is a diagram for explaining a method for protecting a primary system of an interference margin iterative allocation type.

Next, a method for protecting the primary system of the interference margin iterative allocation type will be described. As described above, in the interference margin iterative allocation type, the communication control device 40 calculates the maximum allowable transmission power of the secondary system, using a "desired transmission power of the secondary system" as a reference value. FIG. 14 is a diagram for explaining the method for protecting the primary system of the interference margin iterative allocation type. For example, in the interference margin iterative allocation type, each of the communication devices 20 stores desired transmission power information in the storage unit 22. The desired transmission power information is information on transmission power requested from the communication device 20 to the communication control device 40, as information on transmission power required for transmitting radio waves. In the example of FIG. 14, each of the communication devices $20_1$ to $20_4$ holds desired transmission power information A to D. On the basis of the desired transmission power information A to D, the communication control device 40 allocates interference amounts A to D to each of the communication devices $20_1$ to $20_4$.

5. Explanation of Various Procedures

Next, various procedures that may occur between the entities of the communication system 2 will be described.

5-1. Registration Procedure

The registration procedure is a procedure of registering device parameters relating to the communication device 20 in the communication control device 40. Typically, the registration procedure begins when one or more communication systems including the communication device 20 or the communication devices 20 notify the communication control device 40 of a registration request including the above-mentioned device parameters.

Details of Required Parameters

For example, the device parameters are the following information:

Information specific to the communication device
Position information
Antenna information
Wireless interface information
Legal information
Provider information In practice, information other than the above may also be used as the device parameters.

The information specific to the communication device is information capable of specifying the communication device 20, information on hardware of the communication device 20, and the like. For example, the information specific to the communication device includes a serial number, a product number, and the like.

The information capable of specifying the communication device 20 indicates information on the user of the communication device, a serial number of the communication device, and the like. For example, the information on the user of the communication device may be a user ID, a call sign, and the like. The user ID may be uniquely generated by the user of the communication device, or may be issued in advance by the communication control device 40.

For example, the information on hardware of the communication device 20 may include transmission power class information, manufacturer information, and the like. For example, in the FCC Code of Federal Regulations (C.F.R.) Part 96, two classes of Category A and Category B are specified, and one of the information may be included in the transmission power class information. In 3GPP TS 36.104 and TS 38.104, classes of eNodeB and gNodeB are defined, and may also be used.

For example, the information on software of the communication device 20 may include version information, a build number, and the like relating to an execution program in which processes required for interacting with the communication control device 40 is described. The information may also include version information, a build number, and the like of the software to operate as the communication device 20.

Typically, the information on position is information capable of specifying the geographic position of the communication device 20. For example, the information on position is coordinate information obtained by the positioning function such as a Global Positioning System (GPS), Beidou, a Quasi-Zenith Satellite System (QZSS), Galileo, and an Assisted Global Positioning System (A-GPS). Typically, the information may include information on latitude, longitude, altitude, and a positioning error. For example, the information may also be position information registered in an information management device managed by the National Regulatory Authority (NRA) or its entrusted institution. For example, the information may also be the coordinates of X-axis, Y-axis, and Z-axis using a specific geographic position as the original point. An identifier indicating the outdoor/indoor may also be added with such coordinate information.

The information on position may also be information indicating an area where the communication device 20 is located. For example, the information on position may also be information defined by the administration such as zip codes and addresses. For example, an area may be indicated by a set of three or more geographical coordinates. The information indicating the area may also be provided with the coordinate information described above.

When the communication device 20 is located indoor, information indicating the floors of the building may also be added to the information on position. For example, an identifier indicating the number of floors, or above ground or underground may also be added. For example, information further indicating an indoor closed space such as a room number and a room name in the building may also be added.

Typically, the positioning function described above is preferably included in the communication device 20. However, depending on the performance of the positioning function and the installation position, the position information that meets the required accuracy may not always be obtained. Thus, the positioning function may also be used by the provider. In such a case, it is preferable that the position information measured by the provider is written in the communication device 20.

Typically, the antenna information is information indicating the performance and configuration of the antenna included in the communication device 20. Typically, for example, the antenna information may include information such as an antenna installation height, tilt angle (down tilt), azimuth in the horizontal direction, boresight, antenna peak gain, and antenna model.

The antenna information may also include information on formable beam. For example, the antenna information may include information such as a beam width, a beam pattern, and analog/digital beamforming capabilities.

The antenna information may also include information on the performance and configuration of multiple input multiple output (MIMO) communication. For example, the antenna information may also include information such as the number of antenna elements, and the number of maximum spatial streams. The antenna information may also include codebook information to be used; weight matrix information; unitary matrix obtained by the singular value decomposition (SVD), eigen value decomposition (EVD), block diagonalization (BD), and the like; zero-forcing (ZF) matrix; minimum mean square error (MMSE) matrix; and the like. When a maximum likelihood detection (MLD) requiring nonlinear operation is included, information thereof may also be included.

The antenna information described above may also include Zenith of Direction, Departure (ZoD). The ZoD is a kind of a radio wave arrival angle. The ZoD described above may be estimated by another communication device 20, on the basis of radio waves emitted from the antenna of the communication device 20. In this case, the communication device 20 may be a terminal device that operates as a base station or an access point, a device that performs D2D communication, a moving relay base station, or the like. The ZoD may be estimated by a radio wave arrival direction estimation technology such as a multiple signal classification (MUSIC) or estimation of signal propagation via rotation invariance techniques (ESPRIT). The ZoD may be used by the communication control device 40 as measurement information.

Typically, the wireless interface information is information indicating the wireless interface technology of the communication device 20. For example, the wireless interface information may include identifier information indicating technologies used in the Global System for Mobile Communication (GSM) (registered trademark), CDMA2000, Universal Mobile Telecommunications System (UMTS), Evolved Universal Terrestrial Radio Access (E-UTRA), 5G NR, or the next generation cellular system; derivative technologies based on LTE such as MulteFire and LTE-Unlicensed (LTE-U); and standard technologies such as a metropolitan area network (MAN) including WiMAX and WiMAX2+, and IEEE 802.11 wireless LAN. The version number and the release number of the technical specification used to specify the above may also be included. The wireless interface information may not necessarily be a standard technology, and may also include information indicating a proprietary wireless technology.

The wireless interface information may also include frequency band information supported by the communication device 20. For example, the wireless interface information may be expressed by one or more combinations of the upper limit frequency and the lower limit frequency, one or more combinations of the center frequency and bandwidth, one or more 3GPP operating band numbers, and the like.

The frequency band information supported by the communication device 20 may also include capability information such as carrier aggregation (CA) and channel bonding. For example, the frequency band information may also include band information that can be combined. The carrier aggregation may also include information on the band to be used as a primary component carrier (PCC) and a secondary component carrier (SCC). The carrier aggregation may also include the number of CCs that can be aggregated at the same time.

The frequency band information supported by the communication device 20 may also include information indicating the radio wave access priority such as PAL and GAA.

The wireless interface information may also include modulation scheme information supported by the communication device 20. As a typical example, there are information indicating a primary modulation scheme such as frequency shift keying (FSK), n-value phase shift keying (PSK) (n is 2, 4, 8, or the like), and n-value quadrature amplitude modulation (QAM) (n is 4, 16, 64, 256, or the like); and information indicating a secondary modulation scheme such as orthogonal frequency division multiplexing (OFDM), discrete Fourier transform (DFT) spread OFDM (DFT-s-OFDM), and a filter bank multi-carrier (FBMC).

The wireless interface information may also include information on error correction codes. For example, the wireless interface information may include capabilities such as turbo codes, low density parity check (LDPC) codes, and polar codes, and code rate information to be used.

In another aspect, the modulation scheme information and the information on error correction codes may also be represented by a Modulation and Coding Scheme (MCS) index.

The wireless interface information may also include information indicating the function specific to the radio technologies supported by the communication device 20. As a typical example, there is transmission mode (TM) information defined in LTE. The wireless interface information may also include information including two or more modes on a specific function such as the TM described above. The technical specification may also include information on functions not required for the specification, if the communication device 20 is supporting the functions, even though two or more modes are not present.

The wireless interface information may also include radio access technology (RAT) information supported by the communication device 20. For example, the wireless interface information may include information indicating orthogonal multiple access (OMA) such as time division multiple access (TDMA), frequency division multiple access (FDMA), and orthogonal frequency division multiple access (OFDMA); non-orthogonal multiple access (NOMA) such as power division multiple access (PDMA) (a typical example includes a technique implemented by a combination of superposition coding (SPC) and successive interference canceller (SIC)), code division multiple access (CDMA), sparse code multiple access (SCMA), interleaver division multiple access (IDMA), and spatial division multiple access (SDMA); opportunistic access such as carrier sense multiple access/collision avoidance (CSMA/CA) and carrier sense multiple access/collision detection (CSMA/CD); and the like.

The wireless interface information may also include information on a duplex mode supported by the communication device 20. As a typical example, there are a frequency division duplex (FDD), a time division duplex (TDD), and a full duplex (FD). When the TDD is included as the wireless interface information, TDD frame configuration information used/supported by the communication device 20 may be added. Moreover, information on a duplex mode may also be included for each frequency band indicated in the frequency band information described above.

The wireless interface information may also include information on a transmission diversity technique supported by the communication device 20. For example, the wireless interface information may include space time coding (STC) and the like.

The wireless interface information may also include guard band information. For example, the wireless interface information may include information on a guard band size defined in the standard. For example, the wireless interface information may also include information on the guard band size desired by the communication device 20.

Typically, the legal information is information on the regulation with which the communication device 20 must comply, and that is defined by the radio wave administration or an equivalent administration of the country or region, and authentication information obtained by the communication device 20. Typically, for example, the information on the regulation described above may include information on the upper limit value of out-of-band radiation, information on the blocking characteristics of a receiver, and the like. Typically, for example, the authentication information described above may include type approval information (such as FCC ID, and technical conformity certification), regulation control information (for example, the FCC rule numbers, the ETSI harmonized standard numbers, and the like), which will be references for acquiring the authentication.

The information on numerical values in the legal information may be substituted by those defined in the specification of wireless interface technology. For example, the upper limit value of the out-of-band radiation may be derived by using an adjacent channel leakage ratio (ACLR), instead of using the upper limit value information of the out-of-band radiation. Moreover, the ACLR itself may be used according to the needs. Adjacent channel selectivity (ACS) may also be used instead of the blocking characteristics. What has been described above may also be combined, or an adjacent channel interference ratio (ACIR) may be used.

The provider information includes information capable of specifying a person (provider) who has installed the communication device 20, information specific to the provider, and the like. For example, in Non Patent Literature 2, a certified professional installer registration ID (CPIR-ID) and CPI name are disclosed as the information capable of specifying the provider. Moreover, for example, mailing/contact address, email address, telephone number, public key identifier (PKI), and the like are disclosed as the information specific to the provider. The provider information is not limited thereto, and other information on the provider may also be included according to the needs.

Addition to Required Parameters

In the registration procedure, depending on the embodiment, there may also be a case when device parameters of the terminal device 30 are requested to be registered in the communication control device 40, in addition to those of the communication device 20. In such a case, the term "communication device" in the above described Details of Required Parameters may be replaced with the "terminal device" or an equivalent term. The parameters specific to the "terminal device", which are not described in the above described Details of Required Parameters, may also be handled as required parameters during the registration. For example, such parameters include a user equipment (UE) category defined in 3GPP and the like.

Details of Registration Process

Figure 15:
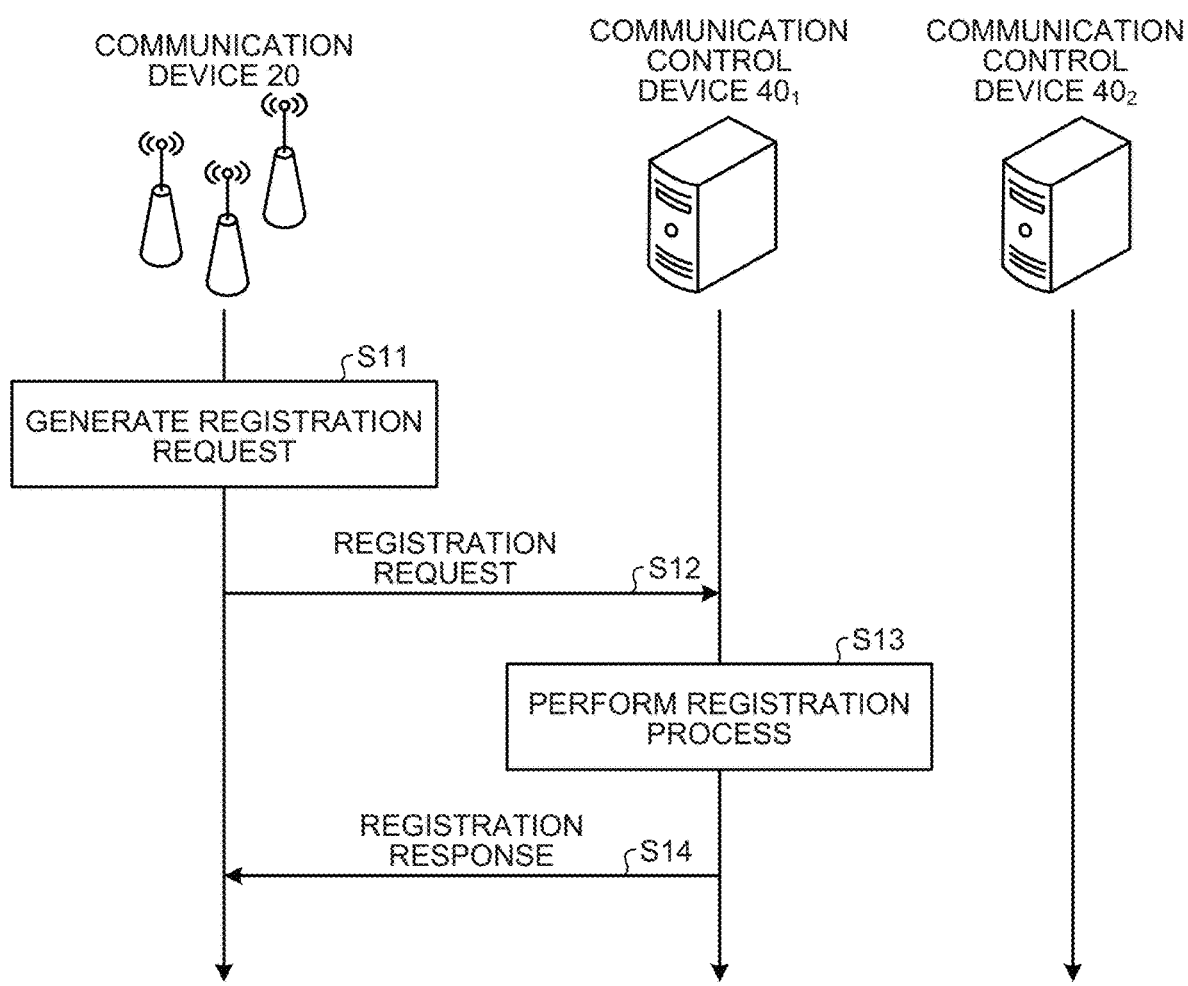
FIG. 15 is a diagram for explaining a leftover margin in a method for protecting a primary system of a low interference node priority type.

FIG. 15 is a sequence diagram for explaining a registration procedure. One or more communication systems including the communication device 20 or the communication devices 20 generate a registration request message using the device parameters described above (step S11), and notifies the communication control device 40 of the generated message (step S12).

When the provider information is included in the device parameters, a tampering prevention process and the like may be performed on the registration request using the information. An encryption process may also be performed on a part or all of the information included in the registration request. More specifically, for example, a process in which a public key specific to the provider is shared in advance between the provider and the communication control device 40, and the provider encrypts information using a secret key, may be performed. For example, information to be encrypted includes security sensitive information such as position information.

For example, as disclosed in Non Patent Literature 2, the provider may also write the position information in the communication control device 40 directly.

After receiving the registration request, the communication control device 40 performs a registration process of the communication device 20 (step S13), and returns a registration response according to the processing result (step S14). If the information required for registration is sufficient and if there is no abnormality, the communication control device 40 records the information in the storage unit 42, and notifies that the registration is completed normally. If not, the communication control device 40 notifies that the registration has failed. When the registration is completed normally, the communication control device 40 may also assign an ID to an individual communication device, and notify the communication device 20 of the ID information by enclosing the information in the response. Typically, when the registration is failed, one or more communication systems including the communication device 20 or the communication devices 20, the operator thereof (for example, a mobile network operator or an individual), or the provider modifies the registration request, and repeats the registration procedure until the registration is completed normally.

The registration procedure may be performed a plurality of times. More specifically, for example, when the position information is changed by more than a predetermined reference due to the move, accuracy improvement, or the like, the registration procedure may be performed again. Typically, the predetermined reference is defined by the legal system. For example, in 47 C.F.R. Part 15, when the position information of a Mode II personal/portable white space device is changed by 100 meters or more, the device is required to access the database again.

5-2. Available Spectrum Query Procedure

The available spectrum query procedure is a procedure in which the communication system representing the communication device 20 or the communication devices 20 queries the communication control device 40 on information relating to the available spectrum. Typically, the procedure begins when the communication system representing the communication device 20 or the communication devices 20 notifies the communication control device 40 of a query request including the information capable of specifying the communication device 20.

1. Example 1

In this example, typically, the available spectrum information is information on spectrum that can be used safely and secondarily without giving a fatal interference to the primary system at the position of the communication device 20. For example, when the communication device 20 is installed in a secondary access prohibited area such as an exclusion zone, to protect the primary system using a frequency channel of F1, the frequency channel of F1 is not notified to the communication device 20 as an available channel.

2. Example 2

Moreover, for example, even when the communication device 20 is outside the secondary access prohibited area, the frequency channel is not notified to the communication device 20 as an available channel, if it is determined that the communication device 20 may give a fatal interference to the primary system.

3. Example 3

The available spectrum information may also include a frequency channel that is not notified to the communication device 20 as an available channel, according to the conditions other than the protection requirements of the primary system in the case 2. More specifically, for example, to prevent interference that may generate between the communication devices 20 in advance, the frequency channel used by another communication device 20, which is located in the vicinity of the communication device 20, may not be notified to the communication device 20 as an available channel.

4. Example 4

Even when a situation corresponds to these cases (Example 2 and Example 3) described above, it is possible to notify the communication device 20 of the frequency the same as that of the primary system or that of the communication device 20 in the vicinity as an available channel. In such a case, typically, the maximum available transmission power information is included in the available spectrum information. Typically, the maximum available transmission power is expressed by the equivalent isotropic radiated power (EIRP). However, it is not limited thereto, and for example, the maximum available transmission power may also be provided by a combination of conducted power and antenna gain. The feeder loss may also be included. In the antenna gain, an available peak gain may also be set for each spatial direction.

Details of Required Parameters

For example, the information capable of specifying the communication device 20 may be information specific to the communication device registered during the registration procedure described above, and the ID information explained in Details of Registration Process described above.

The query request may also include query requirement information. For example, the query requirement information may also include information indicating the frequency band the availability of which the user wishes to know. For example, the query requirement information may also include transmission power information. For example, the communication system representing the communication device 20 or the communication devices 20 may also include transmission power information, when the user only wishes to know the spectrum information with which a desired transmission power may be used. The query requirement information may not necessarily be included.

The query request may also include a measurement report. The measurement report includes results of measurements performed by the communication device 20 and/or the terminal device 30. For example, the measurement report may include processed information in addition to raw data. For example, standardized metrics such as a reference signal received power (RSRP), a reference signal strength indicator (RSSI), and a reference signal received quality (RSRQ) may be used.

Details of Available Spectrum Evaluation Process

Figure 16:
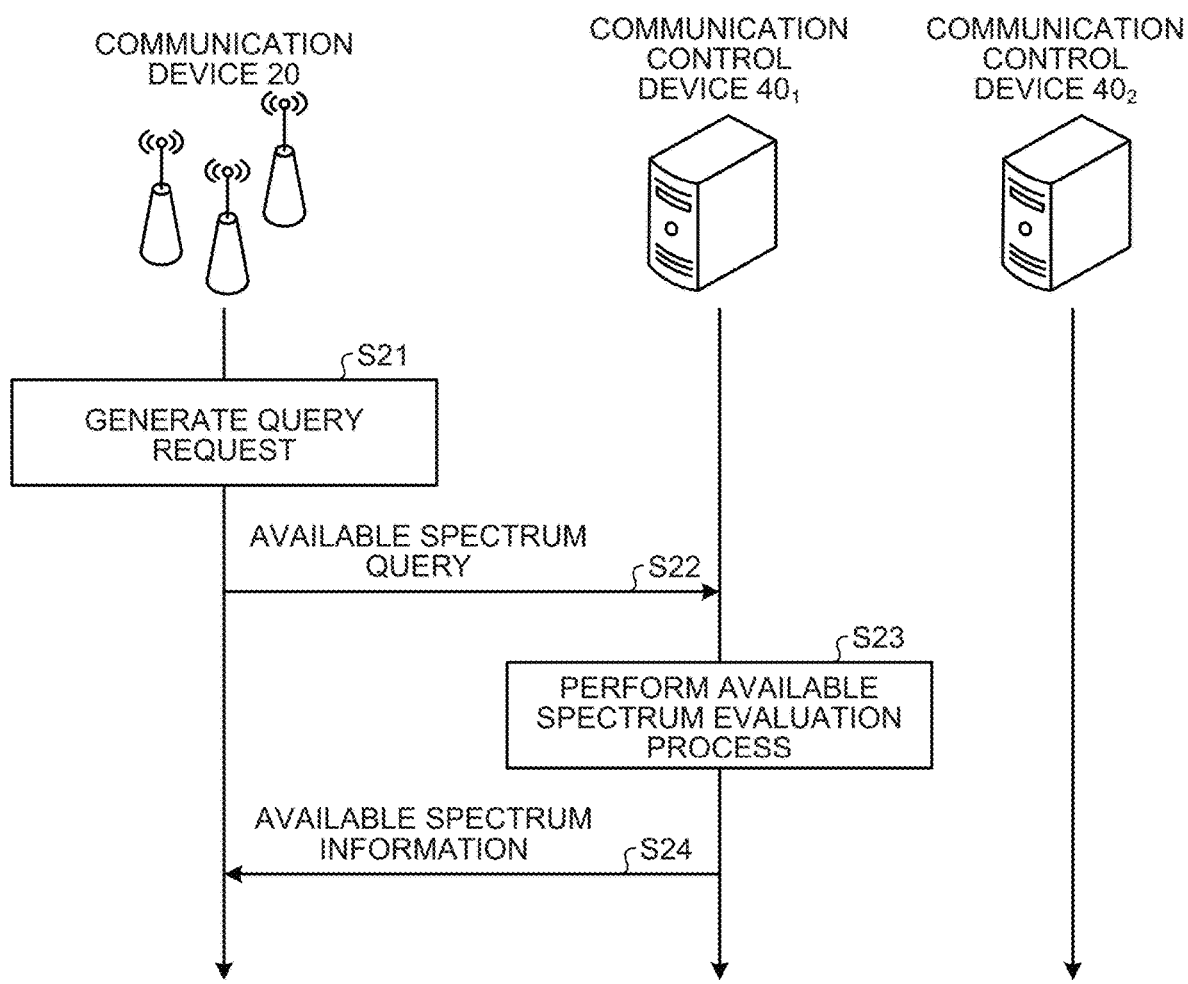
FIG. 16 is a sequence diagram for explaining an available spectrum query procedure.

FIG. 16 is a sequence diagram for explaining an available spectrum query procedure. The communication system representing the communication device 20 or the communication devices 20 generates a query request including the information capable of specifying the communication device 20 (step S21), and notifies the communication control device 40 of the generated request (step S22).

Upon receiving the query request, the communication control device 40 evaluates the available spectrum, on the basis of the query requirement information (step S23). For example, as described in Example 1 to Example 3 described above, it is possible to evaluate the available spectrum by taking into consideration the presence of the primary system, the secondary access prohibited area, and the communication device 20 in the vicinity.

As described in Example 4 described above, the communication control device 40 may also derive the maximum allowable transmission power information. Typically, the allowable transmission power information is calculated using allowable interference power information of the primary system or the protection zone thereof, calculation reference point information of the interference power level applied to the primary system, registration information of the communication device 20, and a propagation loss estimation model. More specifically, for example, the maximum allowable transmission power information is calculated using the following formula.

$$P_{MaxTx(dBm)} = I_{Th(dBm)} + PL(d)(\text{dB}) \quad (1)$$

In this example, $P_{MaxTx(dBm)}$ is the maximum allowable transmission power, $I_{Th(dBm)}$ is the allowable interference power, d is distance between the reference point and the communication device 20, and $PL(d)_{(dB)}$ is the propagation loss at the distance d. In the present formula, the antenna gain of the transmitter/receptor is not explicitly indicated. However, the antenna gain may be included according to the expression method of the maximum allowable transmission power (EIRP, conducted power, and the like), and the reference position of the received power (antenna input point, antenna output point, and the like). To compensate the variation caused by fading, a safety margin and the like may also be included. Moreover, a feeder loss and the like may also be taken into account according to the needs.

The above formula is described on the assumption that the single communication device 20 is the interference source. For example, in a case when the aggregated interference from the communication devices 20 needs to be taken into account at the same time, a correction value may be added. More specifically, for example, the correction value may be determined on the basis of three kinds of interference margin schemes (fixed/predetermined, flexible, and flexible minimized) disclosed in Non Patent Literature 3.

The formula described above is expressed in logarithms. However, in practice, naturally, the logarithms can be converted to antilogarithms. Moreover, all log parameters disclosed in the present disclosure may be converted to bases as appropriate.

1. Technique 1

Moreover, as explained in the paragraph of Details of Required Parameters described above, when the transmission power information is included in the query requirement information, it is possible to evaluate the available spectrum using a method different from that described above. More specifically, for example, when it is assumed that a desired transmission power indicated in the transmission power information is used, and when the estimated given interference amount falls below the allowable interference power of the primary system or the protection zone thereof, it is determined that the frequency channel is available, and the result is notified to the communication device 20.

2. Technique 2

An example of calculating the band use conditions described above is explained on the basis of the other system relevant information described above. However, the present disclosure is not limited to the example. For example, similar to the area in a radio environment map (REM), when the area/space where the communication device 20 can use the shared band is determined in advance, the available spectrum information may also be derived only on the basis of the position relevant information described above and the height relevant information described above. For example, when a lookup table for associating the position, height, and available spectrum information is prepared, it is possible to derive the available spectrum information described above, only on the basis of the position relevant information described above and the height relevant described above.

The available spectrum may not necessarily be evaluated only after receiving the query request. For example, the communication control device 40 may actively evaluate the available spectrum without a query request, after the registration procedure described above is completed normally. In such a case, the communication control device 40 may create the REM or the lookup table described in Technique 2, or a similar information table.

In any technique, evaluation may also be performed on the radio wave access priority such as PAL and GAA. For example, when the information on radio wave access priority is included in the registered device parameters or the query requirement, it is also possible to determine whether the spectrum can be used on the basis of the priority, and notify the communication device 20 of the result. Moreover, for example, as disclosed in Non Patent Literature 2, when the information (referred to as a cluster list in Non Patent Literature 2) relating to the communication device 20 that has a high access priority (for example, PAL) is registered in the communication control device 40 by the user in advance, the evaluation may be performed on the basis of the information.

After evaluating the available spectrum, the communication control device 40 notifies the communication device 20 of the evaluation result (step S24). The communication device 20 may also select desired communication parameters, using the evaluation result received from the communication control device 40.

5-3. Spectrum Grant Procedure

A spectrum grant procedure is a procedure for allowing the communication device 20 to receive a grant to secondarily use the spectrum from the communication control device 40. Typically, the procedure begins after the registration procedure is completed normally, and when one or more communication systems including the communication device 20 or the communication devices 20 notify the communication control device 40 of a spectrum grant request including the information capable of specifying the communication device 20. "After the registration procedure is completed normally" also means that the available spectrum query procedure may not necessarily be performed.

In the present invention, at least the following two schemes of the spectrum grant request may be used.

Specification Scheme

Flexible Scheme

The specification scheme is a request scheme in which the communication device 20 specifies at least the frequency band and the maximum transmission power to be used as desired communication parameters, and requests the communication control device 40 to permit the use on the basis of the desired communication parameters. However, the desired communication parameters are not limited thereto, and the parameters specific to the wireless interface technology (modulation scheme, duplex mode, and the like) may also be specified. Moreover, information on radio wave access priority such as PAL and GAA may also be included.

The flexible scheme is a request scheme in which the communication device 20 only specifies requirements relating to the communication parameters, and requests the communication control device 40 to specify the communication parameters that can use the spectrum secondarily, while meeting the requirements. The requirements relating to the communication parameters may include bandwidth, desired maximum transmission power, or desired minimum transmission power. However, the communication parameters are not limited thereto, and parameters specific to the wireless interface technology (modulation scheme, duplex mode, and the like) may also be specified. More specifically, for example, one or more TDD frame configurations may be selected in advance and notified.

A measurement report may be included in either scheme. The measurement report includes the measurement results performed by the communication device 20 and/or terminal device 30. For example, the measurement report may include processed information in addition to raw data. For example, standardized metrics such as the reference signal received power (RSRP), the reference signal strength indicator (RSSI), and the reference signal received quality (RSRQ) may be used.

Details of Spectrum Grant Process

Figure 17:
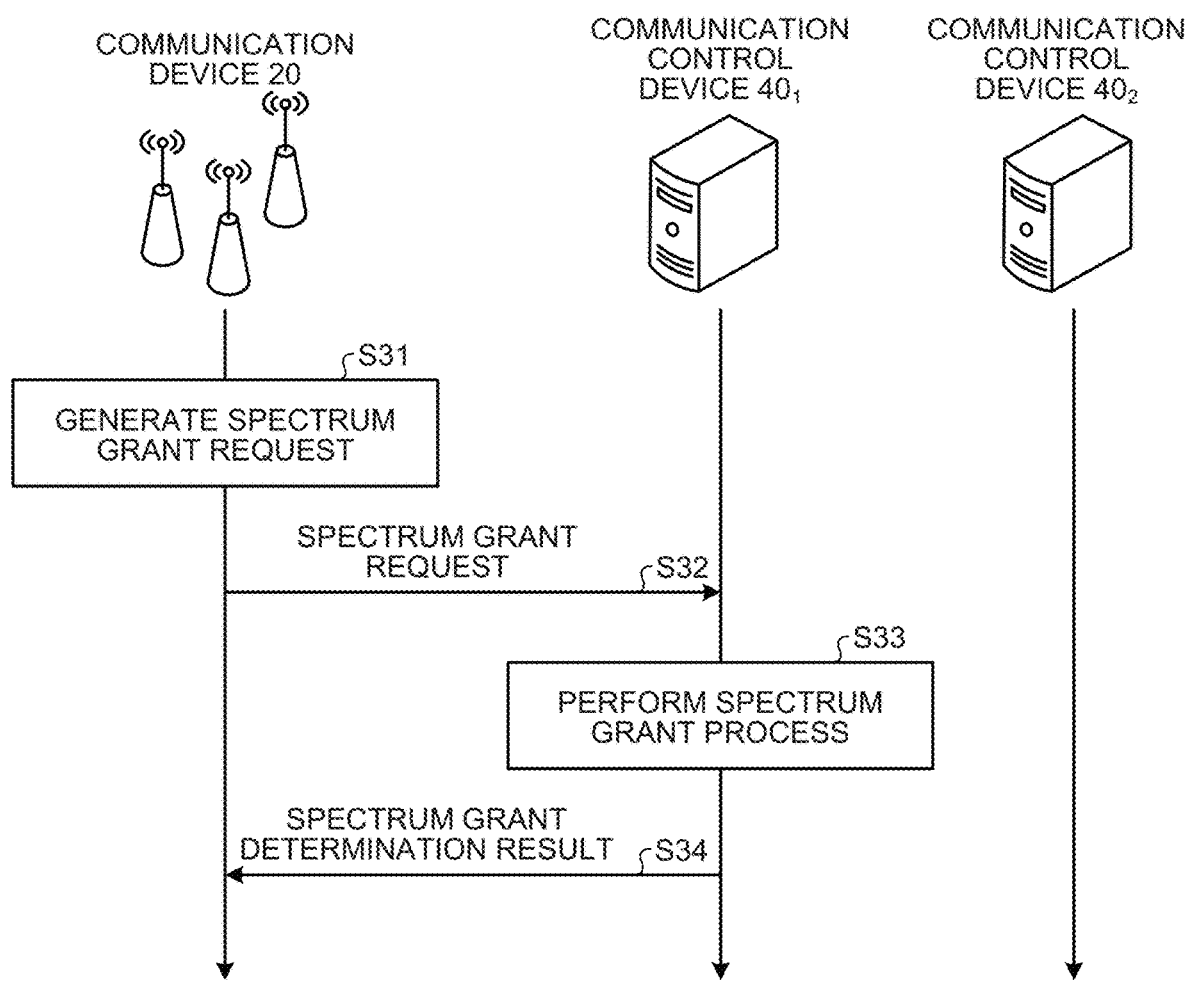
FIG. 17 is a sequence diagram for explaining a spectrum grant procedure.

FIG. 17 is a sequence diagram for explaining the spectrum grant procedure. One or more communication systems including the communication device 20 or the communication devices 20 generate a spectrum grant request including the information capable of specifying the communication device 20 (step S31), and notifies the communication control device 40 of the generated request (step S32). The spectrum grant request is acquired by the acquisition unit 441 of the communication control device 40.

After acquiring the spectrum grant request, the communication control device 40 performs a spectrum grant process on the basis of the spectrum grant request scheme (step S33). For example, the communication control device 40 can perform the spectrum grant process by taking into consideration the presence of the primary system, the secondary access prohibited area, and the communication device 20 in the vicinity, using the techniques described in Example 1 to Example 3 in 2.2. Available Spectrum Query Procedure.

When the flexible scheme is used, the communication control device 40 may also derive the maximum allowable transmission power information, using the technique described in Example 4 in 2.2. Available Spectrum Query Procedure. Typically, the communication control device 40 calculates the maximum allowable transmission power using the allowable interference power information of the primary system or the protection zone thereof, the calculation reference point information of the interference power level applied to the primary system, the registration information of the communication device 20, and a propagation loss estimation model. For example, the communication control device 40 calculates the maximum allowable transmission power using the following formula (2).

$$P_{MaxTx(dBm)} = I_{Th(dBm)} + PL(d)_{(db)} \qquad (2)$$

In this example, $P_{MaxTx(dBm)}$ is the maximum allowable transmission power, $I_{Th(dBm)}$ is the allowable interference power, d is distance between the reference point and the communication device 20, and $PL(d)_{(dB)}$ is the propagation loss at the distance d. In the present formula, the antenna gain of the transmitter/receptor is not explicitly indicated. However, the formula may be modified according to the expression method of the maximum allowable transmission power (EIRP, conducted power, and the like) and the reference position of the received power (antenna input point, antenna output point, and the like). To compensate the variation caused by fading, a safety margin and the like may also be included. Moreover, a feeder loss and the like may also be taken into account according to the needs.

The above formula is described on the assumption that the single communication device 20 is an interference source. For example, in a case when the aggregated interference from the communication devices 20 needs to be taken into account at the same time, a correction value may be added. More specifically, for example, the correction value may be determined on the basis of three kinds of schemes (fixed/predetermined, flexible, and flexible minimized) disclosed in Non Patent Literature 3.

Various models may be used for the propagation loss estimation model. When a model is specified for each usage, it is preferable to use the specified model. For example, in Non Patent Literature 6, a propagation loss model such as extended Hata (eHATA) and an irregular terrain model (ITM) is used for each usage. Naturally, in practicing the present invention, the propagation loss model is not limited to these examples.

When a model is not specified in a predetermined usage, different models may be used according to the needs. As a specific example, for example, an aggressive model such as a free space loss model may be used for estimating the interference power given to another communication device 20, and a conservative model may be used for estimating the coverage of the communication device 20.

When the specification scheme is used, the spectrum grant process may be performed using the technique described in Technique 1 in 2.2. Available Spectrum Query Procedure. More specifically, for example, when it is assumed that the desired transmission power indicated in the transmission power information is used, and when the estimated given interference amount falls below the allowable interference power of the primary system or the protection zone, it is determined that the use of the frequency channel is granted, and the result is notified to the communication device 20.

In any of the techniques, an evaluation may also be performed on the radio wave access priority such as PAL and GAA. For example, when the information on radio wave access priority is included in the registered device parameters or the query requirement, it is possible to determine whether the spectrum can be used on the basis of the priority, and notify the communication device 20 of the result. Moreover, for example, as disclosed in Non Patent Literature 2, when the information (referred to as a cluster list in Non Patent Literature 2) relating to the communication device 20 that has a high access priority (for example, PAL) is registered in the communication control device 40 by the user in advance, the evaluation may be performed on the basis of the information.

The spectrum grant process may not necessarily be performed upon receiving the request. For example, the communication control device 40 may actively perform the spectrum grant process without a spectrum grant request, after the registration procedure described above is completed normally. Moreover, for example, the spectrum grant determination process may be performed in a fixed cycle. In such a case, the communication control device 40 may create the REM or the lookup table described in Technique 2 in 2.2. Available Spectrum Query Procedure, or a similar information table.

After completing the spectrum grant process, the communication control device 40 notifies the communication device 20 of the determination result (step S34).

5-4. Spectrum Use Notification/Heartbeat

The spectrum use notification is a procedure in which the communication system representing the communication device 20 or the communication devices 20 notifies the communication control device 40 of the spectrum use, on the basis of the communication parameters that have become available in the spectrum grant procedure described above. Typically, the spectrum use notification begins when the communication system representing the communication device 20 or the communication devices 20 notifies the communication control device 40 of a notification message including the information capable of specifying the communication device 20.

It is preferable that the procedure is periodically performed until the use of spectrum is rejected by the communication control device 40. When the procedure is completed normally, the communication device 20 may start or continue radio wave transmission.

Figure 18:
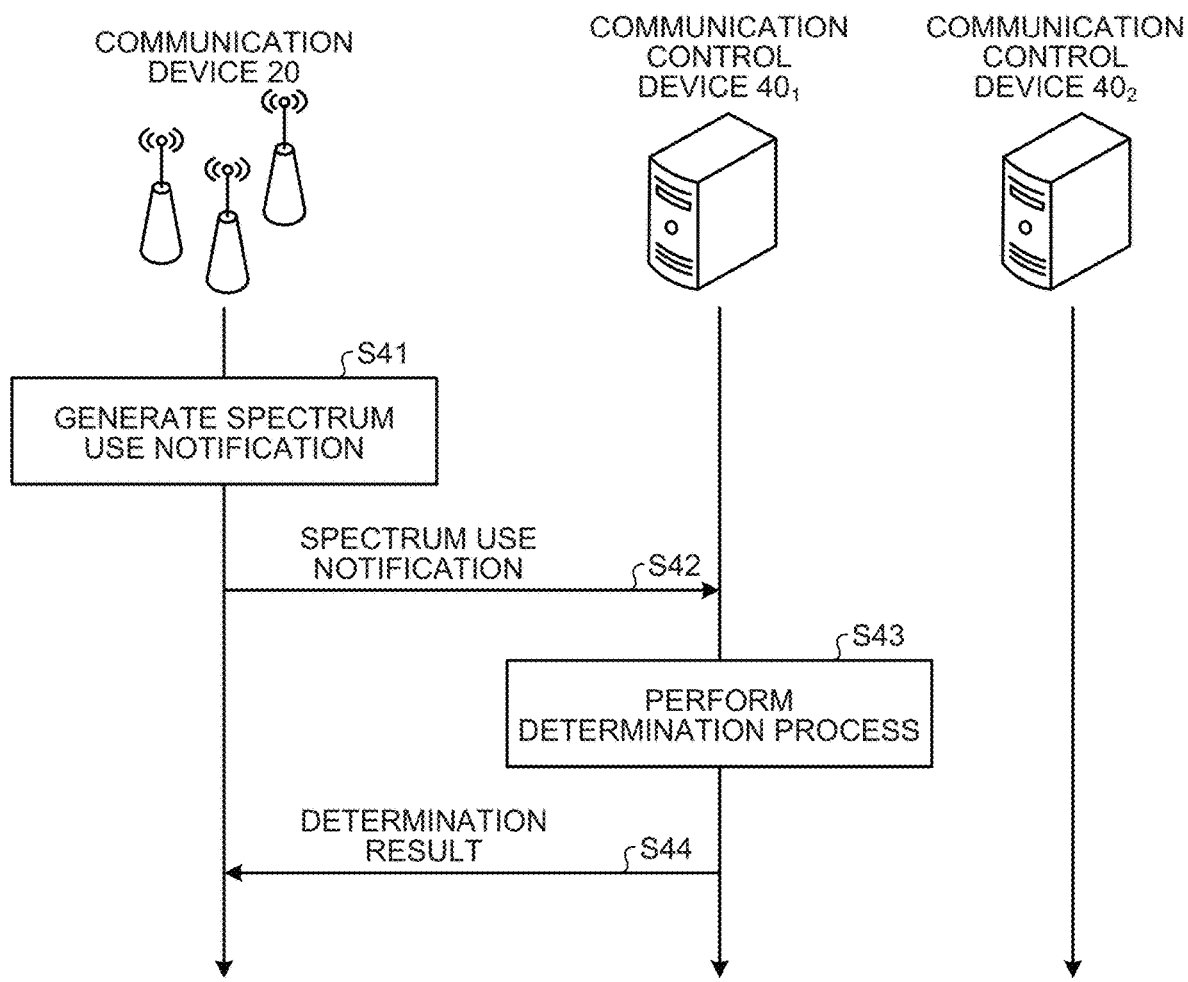
FIG. 18 is a sequence diagram for explaining a spectrum use notification procedure.

FIG. 18 is a sequence diagram for explaining the spectrum use notification procedure. One or more communication systems including the communication device 20 or the communication devices 20 generate a notification message including the information capable of specifying the communication device 20 (step S41), and notify the communication control device 40 of the generated message (step S42).

After receiving the spectrum use notification, the communication control device 40 may also determine whether it is possible to start/continue radio wave transmission (step S43). For example, the determination method includes confirmation of the spectrum use information of the primary system. More specifically, it is possible to determine whether to give permission to start or continue radio wave transmission, or reject radio wave transmission, on the basis of a change in the spectrum used by the primary system, a change in the spectrum use status of the primary system (for example, shipborne radar) that uses radio waves in a non-stationary manner, and the like.

When the determination process is completed, the communication control device 40 notifies the communication device 20 of the determination result (step S44).

In the present procedure, the communication control device 40 may give a command to reconfigure the communication parameters to the communication device 20. Typically, the command may be included in the response of a spectrum use notification. For example, recommended communication parameter information may be provided.

5-5. Addition to Various Procedures

In this example, the various procedures may not necessarily be implemented individually as will be described below. For example, a procedure different from the above described two procedures may also be implemented, by using a third procedure including the roles of the two different procedures as a substitute. More specifically, for example, the registration request and the available spectrum query request may be integrally notified. Moreover, for example, the spectrum grant procedure and the spectrum use notification may be integrally performed. Naturally, the combinations are not limited thereto, and three or more requests may also be combined. Moreover, the above procedures may also be performed separately.

The expression of "acquire information" or an equivalent expression in the present specification does not literally mean to acquire information as in the procedure described above. For example, the position information of the communication device 20 is used in the available spectrum evaluation process. However, there is no need to use the information acquired in the registration procedure, and when the position information is included in the available spectrum query procedure request, the position information may also be used. In other words, the described parameters may be included in the other procedure, within the scope of the present specification, and within the scope of technical feasibility.

The information included in the response sent from the communication control device 40 to the communication device 20 indicated in the procedure described above, may also be sent by push notification. As a specific example, available spectrum information, recommended communication parameter information, radio wave transmission continuation rejection notification, and the like may be sent by push notification.

5-6. Various Procedures Relating to Terminal Device

Basically, the procedures described in 5-1 to 5-4 may also be used for the terminal device 30. However, unlike the communication device 20, the terminal device 30 has a mobility. In other words, the position information is dynamically updated. Some legislations require the terminal device 30 to re-register to the communication control device 40, when the position information is changed for a certain number of times or more. Consequently, in the UK, the Office of Communications (Ofcom) specifies the following two communication parameters as operation modes (see Non Patent Literature 4).

Specific Operational Parameters
Generic Operational Parameters

In the Non Patent Literature, the specific operational parameters are defined as "operational parameters specific to a particular slave white space device (WSD)". In other words, the specific operational parameters are communication parameters calculated using the device parameters of the slave WSD corresponding to the terminal device 30. Characteristically, the specific operational parameters are calculated by the white space database (WSDB) using the position information of the slave WSD.

From such characteristics, it is assumed that the specific operational parameters are suitable for the terminal device 30 that has a low mobility or that is installed in a fixed manner.

In the Non Patent Literature, the generic operational parameters are defined as "operational parameters that can be used by any slave WSD within the coverage area of a given master WSD (corresponds to communication device 20)". Characteristically, the generic operational parameters are calculated by the WSDB without using the position information of the slave WSD.

From these characteristics, it is assumed that the generic operational parameters are suitable for the terminal device 30 that has a high mobility.

The information for the terminal device 30 may be provided by unicast or broadcast from the communication device 20. For example, a broadcast signal such as a contact verification signal (CVS) defined in the FCC rules Part 15 Subpart H may be used. The information may also be provided by a broadcast signal specific to the wireless interface. More specifically, for example, the information may be provided by a physical broadcast channel (PBCH), an NR-PBCH, and the like used in LTE and 5G NR.

5-7. Procedures Generated Between Communication Control Devices

Information Exchange

Figure 19:
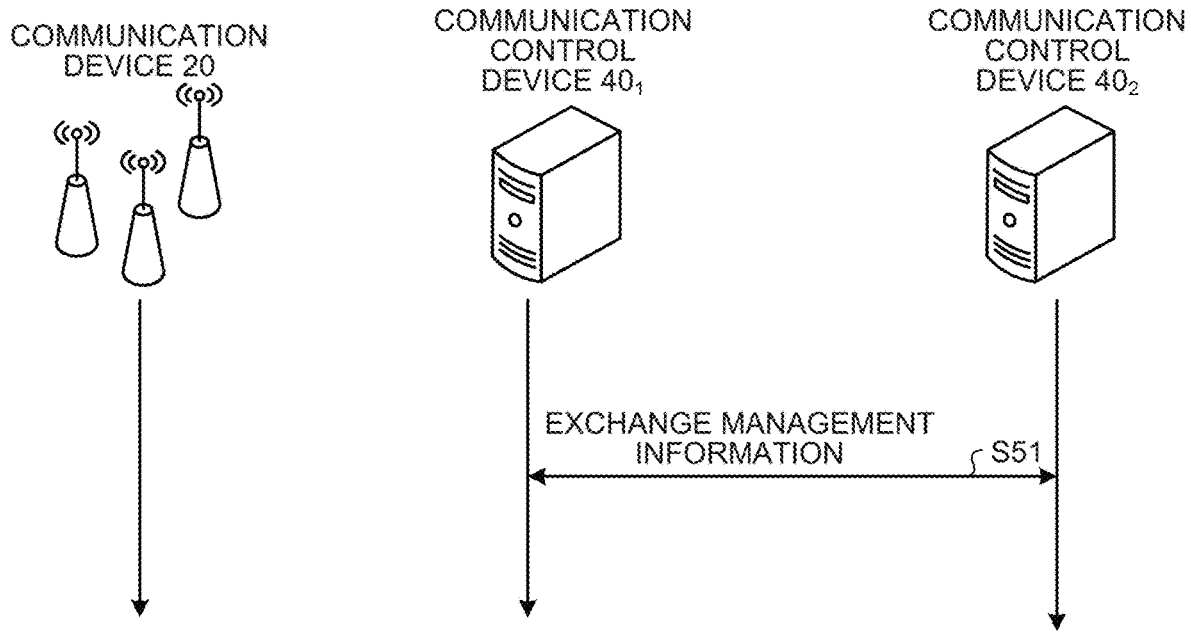
FIG. 19 is a sequence diagram for explaining an exchanging procedure of management information.

The communication control device 40 can exchange management information with another communication control device 40. FIG. 19 is a sequence diagram for explaining an exchanging procedure of management information. In the example of FIG. 19, the communication control device $40_1$ and the communication control device $40_2$ are exchanging information.

In the exchanging procedure of management information, it is preferable that at least the following information are exchanged.

Communication device registration information
Communication device communication parameter information
Area information Typically, the communication device registration information is device parameters of the communication device 20 registered in the communication control device 40 in the registration procedure described above. There is no need to exchange all registered information. For example, information that may correspond to personal information need not be exchanged. Moreover, encrypted and/or ambiguous information may be exchanged when communication device registration information is exchanged. For example, information converted into a binary value and information signed using an electronic signature system may also be exchanged.

Typically, the communication device communication parameter information is information on communication parameters currently used by the communication device 20. It is preferable that the communication device communication parameter information at least includes information indicating the used spectrum and the transmission power. The other communication parameters may also be included.

Typically, the area information is information indicating a predetermined geographical region. Area information of various attributes may be included in the area information in various forms.

For example, the area information may include protection area information of the communication device 20, which will be a high priority secondary system, such as a PAL protection area (PPA) disclosed in Non Patent Literature 5. In this case, for example, the area information may be expressed by three or more sets of geographic position coordinates. Moreover, for example, when the communication control devices 40 can refer to a common external database, the area information may be expressed by ID indicating the information.

Moreover, for example, the area information may also include information indicating the coverage of the communication device 20. In this case also, for example, the area information may be expressed by three or more sets of geographic position coordinates. Moreover, for example, the area information may also be expressed by assuming a circle originating from the geographic position of the communication device 20, and using the information indicating the radius size. Furthermore, for example, when the communication control devices 40 can refer to the common external database, the area information may be expressed by ID indicating the information.

Still furthermore, in another aspect, the area information may also include information on an area section defined in advance by the administration and the like. More specifically, for example, a certain area can be specified by address. For example, a license area and the like may also be expressed similarly.

Still furthermore, in still another aspect, the area information may not always express a planar area, and may also express a three-dimensional space. For example, the area information may be expressed by a spatial coordinate system. For example, information indicating a predetermined closed space such as the number of floors, the floor number, and the room number of the building may also be used.

These types of information may be exchanged using various schemes. The followings are examples of the schemes.

ID specification scheme
Period specification scheme
Area specification scheme
Dump scheme The ID specification scheme is a scheme for acquiring information corresponding to an ID assigned in advance to specify the information managed by the communication control device 40, using the ID described above. For example, it is assumed that the communication control device $40_1$ is managing the communication device 20 referred to as ID:AAA. In this example, the communication control device $40_2$ performs an information acquisition request by specifying ID:AAA to the communication control device $40_1$. Upon receiving the request, the communication control device $40_1$ searches the information on ID:AAA, and notifies the communication control device $40_2$ of the corresponding registration information and communication parameter information of the corresponding communication device 20 in the response.

In the period specification scheme, a specific period is specified, and information that meets predetermined conditions may be exchanged during the period.

For example, the predetermined conditions include the presence of updated information. For example, when acquisition of communication device information during a specific period is specified in a request, possible information to be notified in a response includes the registration information of a communication device 20 newly registered during the period, and the registration information and communication parameter information of a communication device 20 having an information parameter changed during that period.

For example, the predetermined conditions include whether the communication control device 40 is recording. For example, when acquisition of communication control information during a specific period is specified in a request, the registration information and communication parameter information of the communication device 20 recorded by the communication control device 40 during the period may be notified in the response. Moreover, the latest information during the period may be notified. The update history may also be notified for each information.

In the area specification scheme, a specific area is specified, and information belonging to the area are exchanged. For example, when acquisition of communication device information in a specific area is specified in a request, the registration information and communication parameter information of the communication device 20 installed in the area may be notified in the response.

The dump scheme is a scheme for providing all information recorded in the communication control device 40. It is preferable that at least the information on the communication device 20 and the area information are provided by the dump scheme.

The information has been exchanged between the communication control devices 40 all based on a pull scheme. In other words, the information corresponding to the parameters specified in a request is included in the response, and for example, the information exchange may be implemented using an HTTP GET method. However, the information may not always be provided by the pull scheme, and the information may also be actively provided to the other communication control device 40 using a push scheme. For example, the push scheme may be implemented using an HTTP POST method.

Command/Request Procedures

The communication control devices 40 may also send commands and requests to one another. More specifically, for example, there is a reconfiguration of communication parameters of the communication device 20. For example, when it is determined that the communication device 20$_1$ managed by the communication control device 40$_1$ is receiving a large amount of interference from the communication device 20$_4$ managed by the communication control device 40$_2$, the communication control device 40$_1$ may request the communication control device 40$_2$ to change the communication parameters of the communication device 20$_4$.

As another example, there is a reconfiguration of area information. For example, if there is a mistake in the calculation of the coverage information and protection zone information on the communication device 20$_4$ managed by the communication control device 40$_2$, the communication control device 40$_1$ may request the communication control device 40$_2$ to reconfigure the area information. In addition to the above, a request for reconfiguring the area information may be sent for various reasons.

6. Operation of Protecting Primary System

Next, an operation of protecting the primary system of the communication system 2 (secondary system) will be described.

In the present embodiment, the following three processes are considered important.

1. Grouping of communication device to be calculated to protect the primary system
2. Allocation of interference margin to each group
3. Calculation of maximum allowable transmission power based on a method associated with the group In this example, the "communication device to be calculated to protect the primary system" typically refers to the communication device 20 the communication parameters (frequency channel, transmission power, and the like) of which are determined, by taking into consideration the interference given to the primary system. Various references may be used to specify such communication devices 20.

More specifically, for example, the following references may be applied.

Reference 1. A separation distance between an estimated received interference reference point of the primary system and the communication device 20

Reference 2. An inclusion relation of a geographic position of the communication device 20 with respect to an area defined in advance in association with the primary system Reference 3. An estimated given interference amount of the communication device 20 at the estimated received interference reference point of the primary system In the following explanation, the communication device 20 specified as the communication device to be calculated to protect the primary system, is referred to as a target communication device.

6-1. Communication Control Process

First, a communication control process executed by the communication system 2 will be described. The communication control process is a process on radio wave transmission carried out by one or more communication devices 20 (secondary system) that perform a wireless communication using radio waves in the frequency band used by one or more communication systems 1 (primary system).

Figure 20:
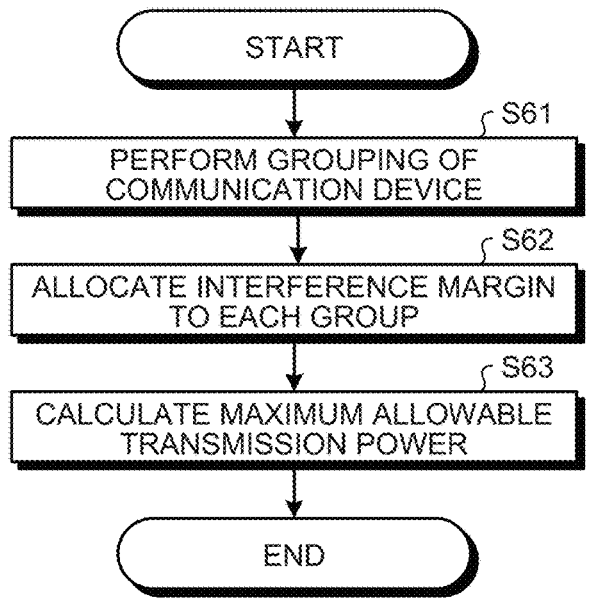
FIG. 20 is a flowchart illustrating an example of a communication control process according to the embodiment of the present disclosure.

FIG. 20 is a flowchart illustrating an example of a communication control process according to the embodiment of the present disclosure.

Grouping of Target Communication Device

First, the classification unit 442 of the communication control device 40 performs grouping of target communication device, on the basis of a "spectrum grant procedure format" executed by the target communication device (step S61). In the present invention, at least two schemes of 1. Specification scheme and 2. Flexible scheme are assumed as the "spectrum grant procedure format". Thus, in the present step, the target communication device will be classified into at least one of a "specification scheme group" and a "flexible scheme group".

The communication control device 40 associates a predetermined method for protecting the primary system with a plurality of groups.

For example, the "specification scheme group" is associated with the method for protecting the primary system of the "interference margin iterative allocation type". The method for protecting the primary system of the interference margin iterative allocation type is represented by an iterative allocation process (IAP) disclosed in Non Patent Literature 6. The communication device 20 in the "specification scheme group" notifies the communication control device 40 of desired transmission power information. Thus, it is preferable that a value equivalent to the desired transmission power or a value close to the desired transmission power as much as possible be permitted. Consequently, to reach the goal, it is useful to associate the "specification scheme group" with the "interference margin iterative allocation type".

The "flexible scheme group" is associated with the method for protecting the primary system of the "interference margin batch allocation type". The method for protecting the primary system of the interference margin batch allocation type is represented by three kinds of schemes (fixed/predetermined, flexible, and flexible minimized) disclosed in Non Patent Literature 3. Unlike the communication device 20 belonging to the "specification scheme group", the communication device 20 belonging to the "flexible scheme group" does not notify the communication control device 40 of a desired transmission power. Consequently, it is not useful to apply the method of the "interference margin iterative allocation type" to the "flexible scheme group". On the other hand, the "interference margin batch allocation type" determines the maximum allowable transmission power by setting a reference value of the maximum allowable transmission power on the basis of the geographic position information of the target communication device, and by applying a transmission power margin value calculated using a predetermined method. Thus, it is suitable to apply the "interference margin batch allocation type" to the "flexible scheme group".

Details will be added using the method in Non Patent Literature 3 as an example. In this example, the transmission power margin value described above is substantially equivalent to the "interference margin". Referring to the above formula (2), it is possible to consider $P_{MaxTx(dBm)}$ as the reference value of the maximum allowable transmission power described above.

$$P_{MaxTx(dBm)} = I_{Th(dBm)} + PL(d)_{(db)} \quad (3)$$

A correction value may be determined on the basis of the three kinds of schemes (fixed/predetermined, flexible, and flexible minimized) disclosed in Non Patent Literature 3. In this process, the maximum allowable transmission power may be expressed as the following:

$$P'_{MaxTx(dBm)} = P_{MaxTx(dBm)} - \alpha_{(dBm)} \quad (4)$$

In the formula, the left side is the maximum allowable transmission power, and α(dBm) in the right side is the transmission power margin. This formula may be modified as follows.

$$P'_{MaxTx(dBm)} = P_{MaxTx(dBm)} - \alpha_{(dBm)} = I_{Th(dBm)} + PL(d)_{(dB)}$$

$$P'_{MaxTx(dBm)} = I_{Th(dBm)} - \alpha_{(dBm)} + PL(d)_{(dB)}$$

$$P'MaxTx(dBm) = I'Th(dBm) + PL(d)(dB) \quad (5)$$

In this example, it is $I'_{Th(dBm)} = I_{Th(dBm)} - \alpha_{(dBm)}$. In other words, this is equivalent to allocating a predetermined amount of the total allowable interference amount $I_{Th(dBm)}$ to a plurality of the target communication devices.

When there are more "spectrum grant procedure formats", the types of groups may be increased. In this case, it is preferable that there is a method for protecting the primary system corresponding to the group. However, when the method is either the "interference margin iterative allocation type" or the "interference margin batch allocation type", the group may be handled the same as the "specification scheme group" or the "flexible scheme group" in the subsequent processes.

Temporary Allocation of Interference Margin to Each Group

Next, the calculation unit 443 of the communication control device 40 temporarily allocates the interference margin to each group (step S62). In the following explanation, an interference margin temporarily allocated to the "specification scheme group" is expressed as $I_{Fixed(dBm)}$ and an interference margin temporarily allocated to the "flexible scheme group" is expressed as $I_{Flexible(dBm)}$.

Temporary Allocation of Interference Margin to Each Group

After temporary allocating the interference margin to each group, the calculation unit 443 of the communication control device 40 calculates the communication parameter (for example, maximum allowable transmission power) of the target communication device (step S63). In the following explanation, it is assumed that the communication control device 40 calculates the maximum allowable transmission power as the communication parameter. The calculation process of the maximum allowable transmission power may include the following three processes (first example to third example).

6-2. Maximum Allowable Transmission Power Calculation Process (First Example)

Figure 21:
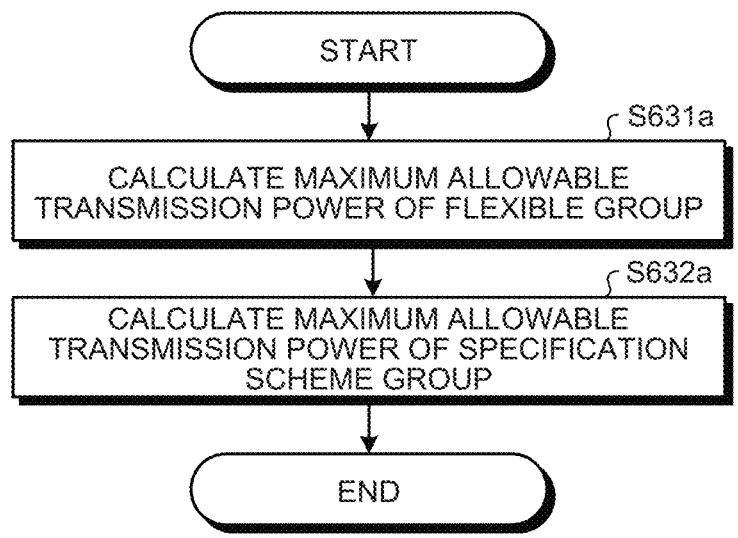
FIG. 21 is a flowchart illustrating an example of a maximum allowable transmission power calculation process according to the embodiment of the present disclosure.

Firstly, the first example will be described. In the first example, the communication control device 40 first calculates the maximum allowable transmission power of the target communication device in the flexible scheme group, and then calculates the maximum allowable transmission power of the target communication device in the specification scheme group. FIG. 21 is a flowchart illustrating an example of the maximum allowable transmission power calculation process according to the embodiment of the present disclosure.

The calculation unit 443 of the communication control device 40 calculates the maximum allowable transmission power of the target communication device in the flexible scheme group (step S631*a*). As described above, the technique of the "interference margin batch allocation type" associated with the flexible scheme group is used for the calculation method. For example, the calculation unit 443 uses a calculation technique of the maximum allowable EIRP disclosed in Non Patent Literature 3 and the like. In the following explanation, the maximum allowable transmission power calculated for the predetermined target communication device is referred to as $P'_{MaxTx,i(dBm)}$ (i is an index number of the target communication device).

In the present embodiment, after calculating the maximum allowable transmission power $P'_{MaxTx,i(dBm)}$, the calculation unit 443 calculates a leftover margin $I_{Leftover,i(dBm)}$. In this example, the leftover margin is a leftover of the allocated interference margin generated by constraints on the target communication device and the like.

Generation Factor 1 of Leftover Margin

More specifically, for example, the generation factor of the leftover margin includes a transmission power limit value ($P_{MaxTxLimit,i\ (dBm)}$) due to the hardware constraints of the target communication device. When the transmission power limit value is lower than the above-mentioned maximum allowable transmission power (in other words, $P_{MaxTxLimit,i(dBm)} < P'_{MaxTx,i(dBm)}$), the interference power given to the primary system from the target communication device becomes smaller than the value ($I'_{Th(dBm)} = I_{Th(dBm)} - \alpha_{(dBm)}$ in formula (5)) used for calculating $P'_{MaxTx,i(dBm)}$.

Generation Factor 2 of Leftover Margin

For example, the other generation factor includes a transmission power limit value due to a transmission power class that is legally defined. For example, in the FCC rules Part 96, two types of communication device classes (Category A/Category B) are defined, and the maximum equivalent isotropic radiated power (EIRP) of the Category A and the Category B are defined as 30 dBm/10 MHz and 47 dBm/10 MHz, respectively. Similarly, when the transmission power limit value resulting from the above is lower than the above-mentioned maximum allowable transmission power (in other words, $P_{MaxTxLimit,i(dBm)} < P'_{MaxTx,i(dBm)}$), the interference power given to the primary system from the target communication device will become smaller than the value ($\Gamma'_{Th(dBm)} = \Gamma_{Th(dBm)} - \alpha_{(dBm)}$ of the formula (5)) used for calculating $P'_{MaxTx,i(dBm)}$.

Generation Factor 3 of Leftover Margin

Moreover, for example, as one of the hardware constraints of the target communication device, there may be a step size according to the transmission power adjustment. However, the maximum allowable transmission power described above may not be included in the adjustable transmission power value of the target communication device. In such a case, one of the adjustable transmission power values equal to or less than the maximum allowable transmission power described above (typically maximum value) will be selected. Thus, the leftover margin similar to the above may be generated.

Generation Factor 4 of Leftover Margin

Moreover, for example, a range of required transmission power (minimum value and/or maximum value) may be provided, as one of the parameters of the spectrum grant request of the "flexible scheme". In such a case, in particular, when the maximum value is indicated, the leftover margin similar to the above may be generated.

The leftover margin $I_{Leftover,i(dBm)}$ generated by the factor represented above may be expressed as the following.

$$I_{leftover,i(dBm)} = 10\log\left(10^{\frac{P'_{MaxTx(dBm)}}{10}} - 10^{\frac{P_{MaxTxLimit,i(dBm)}}{10}}\right) - PL(d)_{(dB)} \quad (6)$$

The derivation process is as follows:

$$\Gamma'_{Th(dBm)} = P'_{MaxTx(dBm)} - PL(d)_{(dB)} \quad (7)$$

Moreover, when the transmission power is $P_{MaxTxLinnt,i(dBm)}$, and the given interference power is $I_{Limit(dBm)}$, it is $$I_{Limit(dBm)} = P_{MaxTxLimit,i(dBm)} - PL(d)_{(dB)} \quad (8)$$

The formula (7) and formula (8) are expressed in antilogarithms, and both sides are subtracted from each other.

$$10^{\frac{\Gamma'_{Th(dBm)}}{10}} - 10^{\frac{I_{Limit(dBm)}}{10}} = \quad (9)$$
$$10^{\frac{P'_{MaxTx(dBm)} - PL(d)_{(dB)}}{10}} - 10^{\frac{P_{MaxTxLimit,i(dBm)} - PL(d)_{(dB)}}{10}}$$

Then, both sides are reconverted to logarithms.

$$I_{leftover,i(dBm)} = 10\log\left(10^{\frac{\Gamma'_{Th(dBm)}}{10}} - 10^{\frac{I_{Limit(dBm)}}{10}}\right) \quad (10)$$
$$= 10\log\left(10^{\frac{P'_{MaxTx(dBm)} - PL(d)_{(dB)}}{10}} - \right.$$

-continued
$$\left. 10^{\frac{P_{MaxTxLimit,i(dBm)} - PL(d)_{(dB)}}{10}}\right)$$
$$= 10\log\left(\left(10^{\frac{P'_{MaxTx(dBm)}}{10}} - 10^{\frac{P_{MaxTxLimit,i(dBm)}}{10}}\right) \cdot 10^{\frac{-PL(d)_{(dB)}}{10}}\right)$$
$$= 10\log\left(10^{\frac{P'_{MaxTx(dBm)}}{10}} - 10^{\frac{P_{MaxTxLimit,i(dBm)}}{10}}\right) - PL(d)_{(dB)}$$

In this manner, the formula (6) described above is derived. As described above, the communication control device 40 calculates the leftover margin of all target communication devices.

In the present embodiment, the leftover margin described above is given to the target communication device of the "specification scheme group". In other words, the temporary interference margin $I_{Fixed(dBm)}$ allocated to the specification scheme group is modified as follows:

$$I_{Fixed,modified(dBm)} = 10\log\left(I_{Fixed} + \sum_{i=0}^{N-1} I_{Leftover,i}\right) \quad (11)$$

The calculation unit 443 of the communication control device 40 allocates the temporary interference margin modified in this manner, to the target communication devices in the specification scheme group (step S632*a*). As described above, the technique of the "interference margin iterative allocation type" associated with the specification scheme group is used for the calculation method. For example, the communication control device 40 uses the iterative allocation process (IAP) disclosed in Non Patent Literature 6 and the like.

When the allocation is completed, the communication control device 40 finishes the process.

The communication device 20 classified into the flexible scheme group only includes the requirements relating to the communication parameters in the spectrum grant request. Thus, in the flexible scheme group, the leftover margin may be generated by the factors (generation factors 1 to 4 of the leftover margin) described above. On the other hand, in the fixed scheme group, the desired maximum transmission power and the spectrum are specified by the communication device 20. Thus, it is considered that the leftover margin is hardly generated in the fixed scheme group. In the first example, the communication control device 40 first calculates the maximum allowable transmission power of the flexible scheme group. Thus, the communication control device 40 can give the leftover margin generated in the flexible scheme group to the specification scheme group. Consequently, the communication control device 40 can achieve efficient utilization of radio wave resources.

6-3. Maximum Allowable Transmission Power Calculation Process (Second Example)

Figure 22:
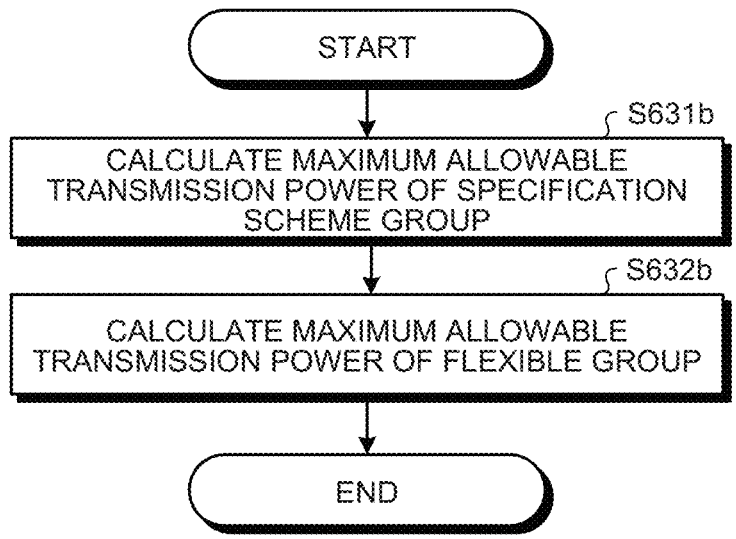
FIG. 22 is a flowchart illustrating another example of the maximum allowable transmission power calculation process according to the embodiment of the present disclosure.

Next, a second example will be described. In the second example, the communication control device 40 first calculates the maximum allowable transmission power of the target communication device in the specification scheme group, and then calculates the maximum allowable transmission power of the target communication device in the flexible scheme group. FIG. 22 is a flowchart illustrating another example of the maximum allowable transmission power calculation process according to the embodiment of the present disclosure.

First, the calculation unit 443 of the communication control device 40 calculates the maximum allowable transmission power of the target communication device in the specification scheme group (step S631b). Then, as described above, the technique of the "interference margin iterative allocation type" associated with the specification scheme group is used for the calculation method.

For example, when the number of target communication devices is small, the leftover margin may also be generated in the specification scheme group. The communication control device 40 calculates the leftover margin, and gives the leftover margin described above to the target communication device of the "flexible scheme group". In other words, the temporary interference margin $I_{Flexible(dBm)}$ allocated to the flexible group is modified on the basis of the leftover margin.

The calculation unit 443 of the communication control device 40 allocates the modified temporary interference margin to the target communication devices in the flexible scheme group (step S632c). As described above, the technique of the "interference margin batch allocation type" associated with the flexible scheme group is used for the calculation method. After the allocation is completed, the communication control device 40 finishes the process.

In the second example, the communication control device 40 first calculates the specification scheme group. Consequently, it is possible to give the leftover margin generated in the specification scheme group to the flexible scheme group. As a result, the communication control device 40 can achieve efficient utilization of radio wave resources.

6-4. Maximum Allowable Transmission Power Calculation Process (Third Example)

Figure 23:
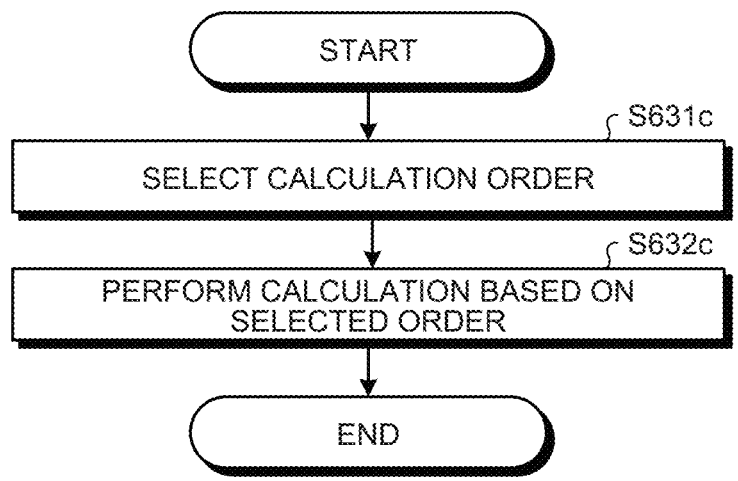
FIG. 23 is a flowchart illustrating another example of the maximum allowable transmission power calculation process according to the embodiment of the present disclosure.

Next, the second example will be described. In the third example, the communication control device 40 determines which of the specification scheme group and the flexible scheme group to be calculated first, based on predetermined criteria. FIG. 23 is a flowchart illustrating another example of the maximum allowable transmission power calculation process according to the embodiment of the present disclosure.

The determination unit 444 of the communication control device 40 determines the group order to calculate the communication parameters (step S631c). For example, the communication control device 40 determines the calculation order of the groups (for example, selection of calculation procedure). Various criteria may be used to make the determination. The following are examples of selection criteria.

Criterion 1. Comparison of Number of Communication Devices in Group

The communication control device 40 first calculates the maximum allowable transmission power of the group with a smaller number of target communication devices. The leftover margin is likely to generate in the group with a smaller number of target communication devices. Thus, the group with a greater number of target communication devices can use more interference margins.

Criterion 2. Comparison of Installation Density of Communication Devices in Group The communication control device 40 first calculates the group in which the communication devices are more densely installed. When the communication devices are more densely installed, the interference between the communication devices in the group is likely to increase, and the transmission power may be further reduced from the maximum allowable transmission power. In such a case, the leftover margin is generated, and it is possible to allocate the leftover margin to the group in which the communication devices are less densely installed.

Criterion 3. Comparison of Number of Communication Devices in Group, and Distance from Protection Point (or Protection Area) of System to be Protected (1)

For example, the communication control device 40 provides a threshold separation distance, and counts the number of communication devices in the flexible group located at a distance larger than the threshold separation distance. When the number is greater than a predetermined threshold, the communication control device 40 first calculates the maximum allowable transmission power of the flexible group. In particular, in the flexible scheme, when the distance from the communication device is increased for a predetermined distance or more, the calculation result of the maximum transmission power is likely to exceed the upper limit of the maximum transmission power of the hardware, and as a result, more leftover margins may be generated.

Criterion 4. Comparison of Number of Communication Devices in Group, and Distance from Protection Point (or Protection Area) of System to be Protected (2)

For example, the communication control device 40 provides a threshold separation distance, and counts the number of communication devices in the specification scheme group located at a distance smaller than the threshold separation distance. When the number is greater than a predetermined threshold, the communication control device 40 first calculates the maximum allowable transmission power of the specification scheme group. In particular, in the specification scheme, when the distance from the communication devices is a predetermined distance or smaller, the calculation result of the maximum transmission power is likely to fall below the desired maximum transmission power, and as a result, more leftover margins may be generated.

Criterion 5. Comparison of Number of Communication Devices in Group, and Distance from Protection Point (or Protection Area) of System to be Protected (3)

The communication control device 40 may also select the calculation procedure using both criteria 3 and 4. In this process, the communication control device 40 may select a procedure that generates more leftover margins.

The criteria for determining the group order are not limited to the criteria 1 to 5 described above. The communication control device 40 may also determine the group order on the basis of other determination criteria.

After determining the group order, the calculation unit 443 of the communication control device 40 calculates the communication parameter (maximum allowable transmission power) in the group order (selected procedure) determined by the determination unit 444 (step S632c).

In the third example, the communication control device 40 first calculates the group that is likely to generate more leftover margins. Consequently, the communication control device 40 can accurately give the leftover margin to the other group. As a result, the communication control device 40 can achieve efficient utilization of radio wave resources.

7. Modifications

The embodiment described above is merely an example, and various changes and applications may be made.

7-1. Master/Slave Model

As described above, the communication system 2 may include the communication control devices 40. In such a case, a control model formed by the communication control devices 40 may be a master/slave model (central control model) as illustrated in FIG. 6. In the master/slave model, each slave communication control device manages and controls the communication device locally, and the master communication control device controls the slave communication control devices collectively and globally. In the example of FIG. 6, the communication control device $40_3$ is the master communication control device, and the communication control devices $40_4$ and $40_5$ are the slave communication control devices.

The slave communication control devices can be categorized as follows:
1. For specification scheme group
2. For flexible scheme group In other words, the communication device employing the specification scheme is managed and controlled by the slave communication control device for the above-mentioned specification scheme group. The communication device employing the flexible scheme is managed and controlled by the slave communication control device for the flexible scheme. In the present modification, the communication control device $40_4$ is categorized for the specification scheme group, and the communication control device $40_5$ is categorized for the flexible scheme group.

For example, the following measures may be applied as a method for making a suitable slave communication control device to manage the communication device 20.
1. Transfer from master communication control device
2. Specify in advance in a contract and the like relating to the connection to the communication control device In the former, the communication device 20 first accesses the master communication control device. In this process, it is preferable that the information on the scheme to be used is notified. After confirming the access, the master communication control device extracts information required for accessing the slave communication control device that supports the above-mentioned scheme information, and notifies the communication device 20 of the information.

For example, the information required for accessing the slave communication control device includes IP address, port number, uniform source locator (URL), public key infrastructure (PKI), username, password, and the like.

In the latter, it is preferable that information required for accessing the slave communication control device is recorded in the communication device 20 in advance. When the software of the communication device 20 supports both schemes, it is preferable to include a function to switch between the slave communication control devices to be connected, according to the intention of the user of the communication device 20 (for example, the scheme to be used).

FIG. 24 is a sequence diagram illustrating an exchange between a master communication control device and slave communication control devices. In the example of FIG. 24, the communication control device $40_3$ is the master communication control device, and the communication control devices $40_4$ and $40_5$ are the slave communication control devices. The communication control device $40_4$ is categorized for the specification scheme group, and the communication control device $40_5$ is categorized for the flexible scheme group. The broken arrows in the drawing are optional, and may not be included.

On the basis of the information required for accessing the slave communication control device, the communication device 20 performs a registration procedure to the slave communication control device. The registration procedure may also be performed by the network manager that manages the communication devices 20.

After completing the registration procedure, the communication device 20 performs the spectrum grant procedure. Upon receiving the spectrum grant request, the slave communication control device evaluates the spectrum grant request using the technique according to the scheme, and notifies the communication device 20 of a grant response.

If the use is approved, the communication device 20 sends a spectrum use notification. The slave communication control device determines whether the radio wave transmission is allowed, and notifies the communication device 20 of the determination result. When the radio wave transmission is allowed, the communication device 20 can start transmitting radio waves.

In this example, to evaluate the spectrum grant request and/or to determine whether radio wave transmission is allowed, protection of the primary system needs to be taken into consideration. However, the slave communication control device only has information on the communication device 20 using a specific scheme. Thus, the requesting unit 446 of the slave communication control device requests the master communication control device of a temporary interference margin (temporary allocation margin) (step S71). The acquisition unit 441 of the slave communication control device then acquires the temporary allocation margin described at step S62 in the communication control process, from the master communication control device (step S72). At least the slave communication control device that manages the "flexible scheme group" acquires the temporary allocation margin $I_{Flexible(dBm)}$. The slave communication control device that manages the "specification scheme group" may not necessarily acquire the temporary allocation margin at this timing.

First, the processing unit 447 of the master communication control device causes the communication control device $40_5$ to calculate the communication parameter (maximum transmission power). The calculation unit 443 of the communication control device $40_5$ calculates the maximum allowable transmission power of the target communication device among the managing communication devices 20, on the basis of the acquired temporary allocation margin $I_{Flexible(dBm)}$ (step S73). Moreover, the communication control device $40_5$ at least calculates the leftover margin $I_{Leftover,i(dBm)}$ and notifies the communication control device $40_3$ (master communication control device) of the calculation result (step S74). Needless to say, the communication control device $40_5$ may also notify the communication control device $40_3$ of the calculation result of the maximum allowable transmission power. The notification is performed by the notification unit 445 of the communication control device $40_5$.

After acquiring the leftover margin $I_{Leftover,i(dBm)}$ the notification unit 445 of the communication control device $40_3$ notifies the slave communication control device that manages the "specification scheme group" of the interference margin (step S75). For example, the interference margin amount notified at this point is $I_{Fixed,modified(dBm)}$ indicated in Formula (11). When the temporary allocation margin $I_{Fixed(dBm)}$ is notified at the timing at step S72, only the modification (modified margin) is notified here.

The processing unit 447 of the master communication control device causes the communication control device $40_4$ to calculate the communication parameter (maximum transmission power). The calculation unit 443 of the communication control device $40_4$ calculates the maximum allowable transmission power of the target communication device, among the managing communication devices 20, on the basis of the modified interference margin $I_{Fixed,modified(dBm)}$ (step S76).

In the present modification also, the communication control device 40 can achieve efficient utilization of radio wave resources, as the maximum allowable transmission power calculation process (first example) described above.

In the present modification, the master communication control device causes the slave communication control device categorized into the flexible scheme group to first calculate the communication parameter (maximum transmission power). However, the master communication control device may also cause the slave communication control device categorized into the specification scheme group to first calculate the communication parameter (maximum transmission power). In this case also, the communication control device 40 can achieve efficient utilization of radio wave resources, as the maximum allowable transmission power calculation process (second example) described above.

Moreover, the master communication control device may also determine the slave communication control device that first calculates the communication parameter (maximum transmission power) on the basis of predetermined criteria. The predetermined criteria may be criteria 1 to 4 indicated in the maximum allowable transmission power calculation process (third example). In such a case, the "group" is replaced with the "slave communication control devices", and the "group order" is replaced with the "slave communication device order". The master communication control device then causes the slave communication devices to calculate the communication parameter (maximum transmission power) in the determined slave communication device order. In this case also, the communication control device 40 can achieve efficient utilization of radio wave resources, as the maximum allowable transmission power calculation process (third example) described above.

The similar architecture is also applicable to a state when the base station function is provided in the terminal device 30 side. In such a case, it is possible to consider the base station as the master communication control device, the terminal base station as the slave communication control device, and the terminal device 30 connected to the terminal base station as the communication device.

7-2. Application of Embodiment

In the embodiment described above, the communication device 20 is categorized into the specification scheme group and the flexible scheme group. The communication device 20 may also be classified into a group other than the specification scheme group and the flexible scheme group. The communication device 20 may further be classified into two or more groups. Similarly, the categorization of the slave communication control device is not limited to the specification scheme group and the flexible scheme group.

7-3. Modification of System Configuration

The communication control device 40 of the present embodiment is not limited to the device described in the above embodiment. For example, the communication control device 40 may also be a device that has a function other than controlling the communication device 20 that secondarily uses the frequency band where spectrum sharing is taking place. For example, the function of the communication control device 40 of the present embodiment may also be included in the network manager. In such a case, for example, the network manager may be a centralized base band unit (C-BBU) having a network configuration called a centralized radio access network (C-RAN), or a device provided therewith. Moreover, the function of the network manager may be included in the base station (including an access point). These devices (such as the network manager) may also be considered as communication control devices.

In the embodiment described above, the communication system 1 is the first radio system, and the communication device 20 is the second radio system. However, the first radio system and the second radio system are not limited to the example. For example, the first radio system may also be a communication device (for example, the communication device 10), and the second radio system may also be a communication system (communication system 2). The radio system in the present embodiment is not limited to the system configured of a plurality of devices, and may be replaced with a "device", a "terminal", and the like as appropriate.

In the embodiment described above, the communication control device 40 is a device belonging to the communication system 2. However, the communication control device 40 may not necessarily be a device belonging to the communication system 2. The communication control device 40 may also be an external device of the communication system 2. The communication control device 40 may not control the communication device 20 directly, but may control the communication device 20 indirectly via a device configuring the communication system 2. Moreover, there may be a plurality of the secondary systems (communication systems 2). In such a case, the communication control device 40 may manage the secondary systems. In this case, each of the secondary systems may be considered as a second radio system.

In general, in the spectrum sharing, the existing system using the target band is referred to as a primary system, and the secondary user is referred to as a secondary system. However, the primary system and the secondary system may also be replaced with other terms. A macro cell in the Heterogeneous Network (HetNet) may be referred to as a primary system, and a small cell and a relay station may be referred to as a secondary system. Moreover, the base station may be referred to as a primary system, and a Relay UE and a Vehicle UE for implementing the D2D and vehicle-to-everything (V2X) that are within the coverage of the primary system may be referred to as a secondary system. The base station may not necessarily be a fixed type, but may also be a portable type or a movable type.

The interface between the entities may be either wired or wireless. For example, the interface between the entities (communication control device, communication device, or terminal device) in the present embodiment may also be a wireless interface that does not depend on the spectrum sharing. For example, the wireless interface that does not depend on the spectrum sharing may be a wireless interface provided via a licensed band by a mobile network operator, a wireless LAN communication using the existing license-exempt band, and the like.

7-4. Other Modifications

The control device that controls the communication device 10, the communication device 20, the terminal device 30, or the communication control device 40 of the present embodiment may be implemented by a dedicated computer system or a general computer system.

For example, a communication program for executing the operation described above (for example, the communication control process, the adjustment process, the allocation process, or the like) is stored in a computer readable recording medium such as an optical disk, a semiconductor memory, a magnetic tape, and a flexible disk to be distributed. Then, for example, the control device is formed by installing the computer program in the computer, and executing the process described above. In such a case, the control device may also be an external device (for example, a personal computer) of the communication device 10, the communication device 20, the terminal device 30, or the communication control device 40. Moreover, the control device may also be a device (for example, the control unit 24, the control unit 34, or the control unit 44) in the communication device 10, the communication device 20, the terminal device 30, or the communication control device 40.

It is also possible to store the communication program described above in a disk drive in the server device on the network such as Internet, and download the communication program in a computer and the like. The function described above may also be implemented by cooperation between the operating system (OS) and application software. In this case, a part other than the OS may be stored in a medium to be distributed, or a part other than the OS may be stored in the server device, and download the part to a computer or the like.

Of the processes described in the embodiment described above, all or a part of the processes that are described as being automatically performed may be manually performed, or all or a part of the processes that are described as being manually performed may be automatically performed with a known method. In addition to the above, information including the processing procedure, specific names, and various types of data and parameters indicated in the specification and drawings described above may be optionally changed unless otherwise specified. For example, various types of information indicated in the drawings are not limited to the information illustrated in the drawings.

The components of the devices illustrated in the drawings are functionally conceptual, and may not necessarily be physically configured as illustrated. In other words, the specific modes of dispersion and integration of each device is not limited to the ones illustrated in the drawings, and all or a part thereof can be functionally or physically dispersed or integrated in an optional unit, depending on various loads and the status of use.

The embodiments described above may also be appropriately combined as long as the processing contents do not contradict each other. Moreover, the order of the steps illustrated in the sequence diagram or flowchart of the present embodiment may be suitably changed.

8. CONCLUSION

As described above, according to one embodiment of the present disclosure, the communication control device 40 acquires the spectrum grant request following a certain scheme from the communication devices 20. The communication control device then groups the communication devices 20 into groups according to the scheme of the spectrum grant request, and calculates the communication parameter of the communication device 20 for each group. Consequently, even when the communication devices 20 of different forms are present in a mixed manner, the communication control device 40 can optimally allocate radio wave resources according to the scheme of the spectrum grant request. As a result, the efficient utilization of radio wave resources will be possible.

While embodiments of the present disclosure have been described, it is to be understood that the technical scope of the present disclosure is not limited to the embodiments described above, and various modifications may be made without departing from the scope and spirit of the present disclosure. Moreover, the components in different embodiments and modifications may also be combined as appropriate.

The effects in the embodiments described in the present specification are merely examples and are not limited thereto. There may also be other effects.

The present technology may also have the following configurations.

(1)

A communication control device, comprising:

an acquisition unit that acquires a spectrum grant request following a certain scheme from a plurality of second radio systems that perform a wireless communication using a radio wave of a frequency band used by a first radio system;

a classification unit that groups the second radio systems into a plurality of groups according to the scheme of the spectrum grant request; and a calculation unit that calculates a communication parameter of the second radio system for each of the groups.

(2)

The communication control device according to (1), wherein the calculation unit calculates the communication parameter of the second radio system in a predetermined group order.

(3)

The communication control device according to (2), wherein the acquisition unit acquires a spectrum grant request following one of a plurality of schemes including, at least, a first scheme that includes information on maximum transmission power and frequency desired by the second radio system, and a second scheme that includes a requirement relating to the communication parameter of the second radio system, and the classification unit classifies the second radio systems into, at least, a first group including the second radio system that uses the first scheme, and a second group including the second radio system that uses the second scheme.

(4)

The communication control device according to (2), wherein the calculation unit calculates the communication parameter of the second radio system by allocating an interference margin to each of the groups, and based on the allocated interference margin, and when a leftover margin is generated in a group calculated first, allocates the leftover margin to a group to be calculated later.

(5)

The communication control device according to (3) or (4), wherein the calculation unit calculates the communication parameter of the second radio group in a sequence of the second group and the first group.

(6)

The communication control device according to (3) or (4), wherein the calculation unit calculates the communication parameter of the second radio system in a sequence of the first group and the second group.

(7)

The communication control device according to (3), wherein the calculation unit calculates the communication parameter of the second radio system classified into the first group, based on a calculation method of an interference margin iterative allocation type.

(8)

The communication control device according to (3), wherein the calculation unit calculates the communication parameter of the second radio system classified into the second group, based on a calculation method of an interference margin batch allocation type.

(9)

The communication control device according to (3), further comprising a determination unit that determines the group order to calculate the communication parameter, wherein the calculation unit calculates the communication parameter in the group order determined by the determination unit.

(10)

The communication control device according to (9), wherein the determination unit determines the group order based on number of the second radio systems in the group.

(11)

The communication control device according to (9), wherein the determination unit determines the group order based on installation density of the second radio systems in the group.

(12)

The communication control device according to (9), wherein the determination unit determines the group order based on number of the second radio systems in the group, and a distance from a protection point or a protection area of the first radio system.

(13)

The communication control device according to (12), wherein when, among the second radio systems classified into the second group, the number of the second radio systems located at the distance from the protection point or the protection area of the first radio system, the distance being larger than a predetermined distance, is larger than a predetermined threshold, the determination unit determines the group order in a sequence of the second group and the first group.

(14)

The communication control device according to (12), wherein when, among the second radio systems classified into the first group, the number of the second radio systems located at the distance from the protection point or the protection area of the first radio system, the distance being smaller than a predetermined distance, is larger than a predetermined threshold, the determination unit determines the group order in a sequence of the first group and the second group.

(15)

A method of controlling communication, the method comprising:

acquiring a spectrum grant request following a certain scheme from a plurality of second radio systems that perform a wireless communication using a radio wave of a frequency band used by a first radio system;

grouping the second radio systems into a plurality of groups according to the scheme of the spectrum grant request; and calculating a communication parameter of the second radio system for each of the groups.

(16)

A communication control program that causes a computer provided in a communication control device to function as an acquisition unit that acquires a spectrum grant request following a certain scheme from a plurality of second radio systems that perform a wireless communication using a radio wave of a frequency band used by a first radio system;

a classification unit that groups the second radio systems into a plurality of groups according to the scheme of the spectrum grant request; and a calculation unit that calculates a communication parameter of the second radio system for each of the groups.

(17)

A communication system, comprising:

a master communication control device; and a first slave communication control device and a second slave communication control device following the master communication control device, wherein the first slave communication control device includes a first acquisition unit that acquires a spectrum grant request following a first scheme from a second radio system that performs a wireless communication using a radio wave of a frequency band used by a first radio system, and a first calculation unit that calculates a communication parameter of the second radio system under the first slave communication control device based on an interference margin notified from the master communication control device, the second slave communication control device includes a second acquisition unit that acquires a spectrum grant request following a second scheme from a second radio system that performs a wireless communication using a radio wave of a frequency band used by a first radio system, and a second calculation unit that calculates a communication parameter of the second radio system under the second slave communication control device based on an interference margin notified from the master communication control device, and the master communication control device includes a processing unit that causes the slave communication control devices to calculate the communication parameters of the respective second radio systems under the slave communication control devices, in a predetermined slave communication control device order.

(18)

The communication system according to (17), wherein the first scheme is a scheme that includes information on a maximum transmission power and frequency desired by the second radio system in the spectrum grant request, and the second scheme is a scheme that includes a requirement relating to the communication parameter of the second radio system in the spectrum grant request.

(19)

The communication system according to (18), wherein the processing unit of the master communication control device causes the second slave communication control device and the first slave communication control device to calculate the communication parameters of the respective second radio systems in this order, the second slave communication control device includes a notification unit that, when an interference margin allocated by the master communication control device is left over, notifies the master communication control device of the interference margin as a leftover margin, and the processing unit of the master communication control device allocates the leftover margin to the first slave communication control device when the leftover margin is notified from the second slave communication control device.

(20)

The communication system according to (18), wherein the processing unit of the master communication control device causes the first slave communication control device and the second slave communication control device to calculate the communication parameters of the respective second radio systems in this order, the first slave communication control device includes a notification unit that when an interference margin allocated by the master communication control device is left over, notifies the master communication control device of the interference margin as a leftover margin; and the processing unit of the master communication control device allocates the leftover margin to the second slave communication control device, when the leftover margin is notified from the first slave communication control device.

REFERENCE SIGNS LIST 1, 2 communication system
10, 20 communication device
30 terminal device
40 communication control device
50 network manager
21, 31, 41 wireless communication unit
22, 32, 42 storage unit
23, 43 network communication unit
24, 34, 44 control unit
211, 311 reception processing unit
212, 312 transmission processing unit
441 acquisition unit
442 classification unit
443 calculation unit
444 determination unit
445 notification unit
446 requesting unit
447 processing unit

The invention claimed is:

1. A communication control device, comprising:
a transceiver; and
circuitry configured to:
acquire a spectrum grant request following a certain scheme from a plurality of second radio systems that perform a wireless communication using a radio wave of a frequency band used by a first radio system;
group the plurality of second radio systems into a plurality of groups according to the scheme of the spectrum grant request; and
calculate a communication parameter of each of the plurality of second radio systems for each of the plurality of groups, wherein
the communication parameter of each of the plurality of second radio systems is calculated in a predetermined group order,
the certain scheme is one of a plurality of schemes that includes, at least, a first scheme that includes information on a desired second radio system maximum transmission power and desired second radio system frequency, and a second scheme that includes a requirement relating to the calculated communication parameter of each of the plurality of second radio systems, and
the circuitry classifies the plurality of second radio systems into, at least, a first group of the plurality of groups including a second radio system of the plurality of second radio systems that uses the first scheme, and a second group of the plurality of groups including a second radio system of the plurality of second radio systems that uses the second scheme.

2. The communication control device according to claim 1, wherein the circuitry calculates the communication parameter of each of the plurality of second radio systems by allocating an interference margin to each of the plurality of groups, and based on the allocated interference margin, and when a leftover margin is generated in a group calculated first, allocates the leftover margin to a group to be calculated later.

3. The communication control device according to claim 1, wherein the circuitry calculates the communication parameter of the second radio group in a sequence of the second group and the first group.

4. The communication control device according to claim 1, wherein the circuitry calculates the communication parameter of each of the plurality of second radio systems in a sequence of the first group and the second group.

5. The communication control device according to claim 1, wherein the circuitry calculates the communication parameter of each of the plurality of second radio systems classified into the first group, based on a calculation method of an interference margin iterative allocation type.

6. The communication control device according to claim 1, wherein the circuitry calculates the communication parameter of each of the plurality of second radio systems classified into the second group, based on a calculation method of an interference margin batch allocation type.

7. The communication control device according to claim 1, wherein the circuitry: determines the group order to calculate the communication parameter, wherein calculates the communication parameter in the determined group order.

8. The communication control device according to claim 7, wherein the circuitry determines the group order based on a number of the plurality of second radio systems in the group.

9. The communication control device according to claim 7, wherein the circuitry determines the group order based on an installation density of the plurality of second radio systems in the group.

10. The communication control device according to claim 7, wherein the circuitry determines the group order based on a number of the plurality of second radio systems in the group, and a distance from a protection point or a protection area of the first radio system.

11. The communication control device according to claim 10, wherein when, among the plurality of second radio systems classified into the second group, a number of the plurality of second radio systems located at the distance from the protection point or the protection area of the first radio system, the distance being larger than a predetermined distance, is larger than a predetermined threshold, the circuitry determines the group order in a sequence of the second group and the first group.

12. The communication control device according to claim 10, wherein when, among the plurality of second radio systems classified into the first group, a number of the plurality of second radio systems located at the distance from the protection point or the protection area of the first radio system, the distance being smaller than a predetermined distance, is larger than a predetermined threshold, the circuitry determines the group order in a sequence of the first group and the second group.

13. A method of controlling communication, the method comprising:
acquiring a spectrum grant request following a certain scheme from a plurality of second radio systems that perform a wireless communication using a radio wave of a frequency band used by a first radio system;
grouping the plurality of second radio systems into a plurality of groups according to the scheme of the spectrum grant request; and calculating a communication parameter of each of the plurality of second radio systems for each of the plurality of groups, wherein the method further comprises:

calculating the communication parameter of each of the plurality of second radio systems in a predetermined group order, wherein the certain scheme is one of a plurality of schemes that includes, at least, a first scheme that includes information on desired second radio system maximum transmission power and desired second radio system frequency, and a second scheme that includes a requirement relating to the calculated communication parameter of each of the plurality of second radio systems, and classifying the plurality of second radio systems into, at least, a first group of the plurality of groups including a second radio system of the plurality of second radio systems that uses the first scheme, and a second group of the plurality of groups including a second radio system of the plurality of second radio systems that uses the second scheme.

14. A communication system, comprising:

a master communication control device; and a first slave communication control device and a second slave communication control device following the master communication control device, wherein the first slave communication control device includes first circuitry that:

acquires a first spectrum grant request following a first scheme from a second radio system, of a plurality of second radio systems, that performs a wireless communication using a radio wave of a frequency band used by a first radio system, and calculates a communication parameter of the second radio system under the first slave communication control device based on an interference margin notified from the master communication control device, the second slave communication control device includes second circuitry that:

acquires a second spectrum grant request following a second scheme from the second radio system, of the plurality of second radio systems, that performs a wireless communication using a radio wave of a frequency band used by the first radio system, and calculates a communication parameter of the second radio system under the second slave communication control device based on the interference margin notified from the master communication control device, and the master communication control device includes circuitry that causes the slave communication control devices to calculate the communication parameters of the plurality of second radio systems under the first and second slave communication control devices, in a predetermined slave communication control device order.

15. The communication system according to claim 14, wherein the first scheme is a scheme that includes information on a desired second radio system maximum transmission power and desired second radio system frequency in the first spectrum grant request, and the second scheme is a scheme that includes a requirement relating to the calculated communication parameters of the second radio system in the second spectrum grant request.

16. The communication system according to claim 15, wherein the circuitry of the master communication control device causes the second slave communication control device and the first slave communication control device to calculate the communication parameters of the plurality of second radio systems in this order, when an interference margin allocated by the master communication control device is left over, the second circuitry notifies the master communication control device of the interference margin as a leftover margin, and the circuitry of the master communication control device allocates the leftover margin to the first slave communication control device when the leftover margin is notified from the second slave communication control device.

* * * * *